United States Patent [19]
Suzuki et al.

[11] Patent Number: 5,841,588
[45] Date of Patent: *Nov. 24, 1998

[54] ZOOM LENS SYSTEM WITH VIBRATION REDUCTION MEANS

[75] Inventors: Kenzaburo Suzuki, Yokohama; Masayuki Aoki, Oyama, both of Japan

[73] Assignee: Nikon Corporation, Tokyo, Japan

[*] Notice: The term of this patent shall not extend beyond the expiration date of Pat. No. 5,502,594.

[21] Appl. No.: 812,284

[22] Filed: Mar. 6, 1997

[30] Foreign Application Priority Data

Mar. 6, 1996 [JP] Japan .................................. 8-079553
Oct. 31, 1996 [JP] Japan .................................. 8-307001

[51] Int. Cl.$^6$ ................................................ G02B 15/14
[52] U.S. Cl. ........................... 359/683; 359/676; 359/677; 359/554; 359/557; 359/746; 359/763; 359/813; 396/55
[58] Field of Search ..................................... 359/683, 676, 359/677, 554, 557, 746, 763, 764, 765, 766, 813

[56] References Cited

U.S. PATENT DOCUMENTS 5,069,537  12/1991  Kitagishi ................................. 359/557
5,416,558  5/1995  Katayama et al. ........................ 396/52
5,502,594  3/1996  Suzuki et al. ............................ 359/557

FOREIGN PATENT DOCUMENTS 1-189621   7/1989   Japan .
1-191112   8/1989   Japan .
1-191113   8/1989   Japan .
1-284823  11/1989   Japan .

*Primary Examiner*—Loha Ben
*Attorney, Agent, or Firm*—Michael N. Meller

[57] ABSTRACT

A zoom lens system with vibration-reduction function, comprising, in order from an object side:

a first lens group having a positive refractive power;
a second lens group having a negative refractive power;
a third lens group having a negative refractive power;
a fourth lens group having a positive refractive power; and
a fifth lens group having a negative refractive power;

wherein, when zooming, each of the distances between the first and second lens groups, the second and third lens groups, the third and fourth lens groups, and the fourth and fifth lens groups, respectively, changes. The fourth lens group has a shift lens unit movable in a direction across an optical axis, has positive refractive power, and a fixed lens unit fixed in the direction across the optical axis.

37 Claims, 40 Drawing Sheets

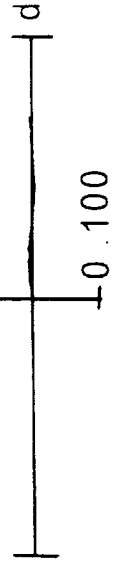
MAXIMUM WIDE-ANGLE STATE
MAXIMUM TELEPHOTO STATE
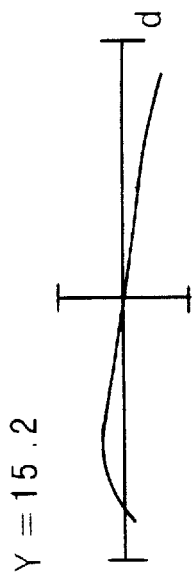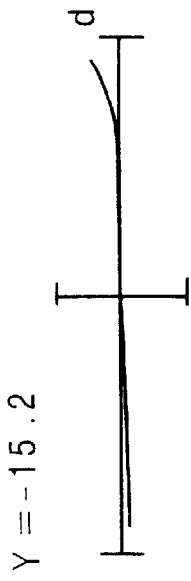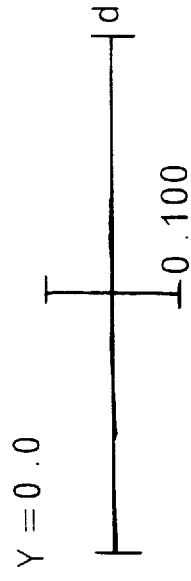
LATERAL CHROMATIC ABERRATION          LATERAL ABERRATION
FIG.19

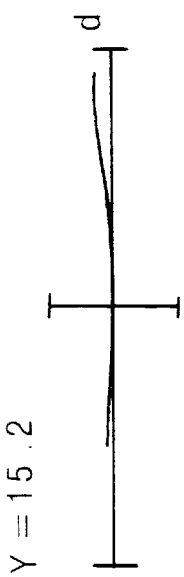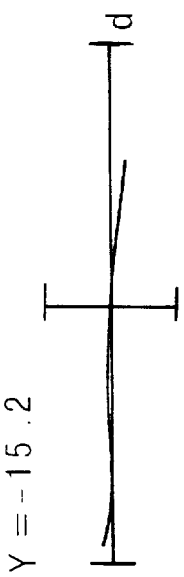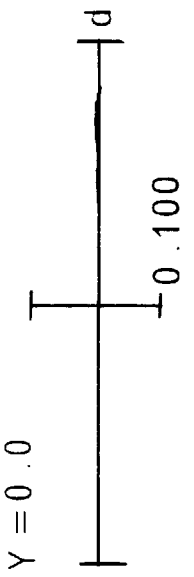
MAXIMUM TELEPHOTO STATE
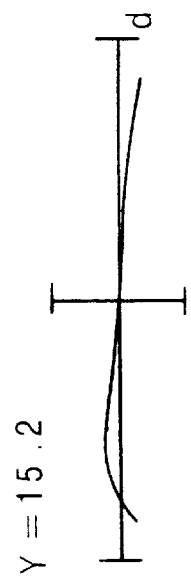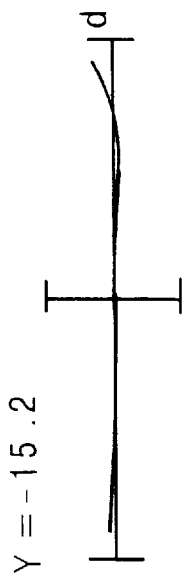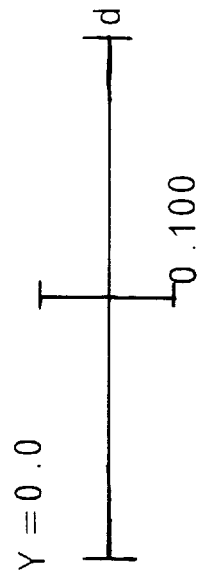
MAXIMUM WIDE-ANGLE STATE
FIG.20
LATERAL CHROMATIC ABERRATION    LATERAL ABERRATION

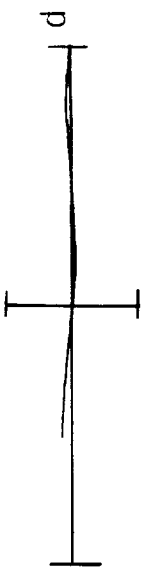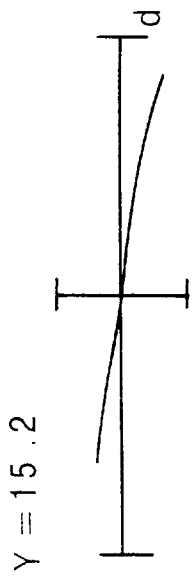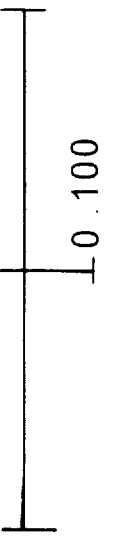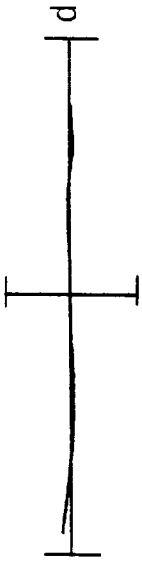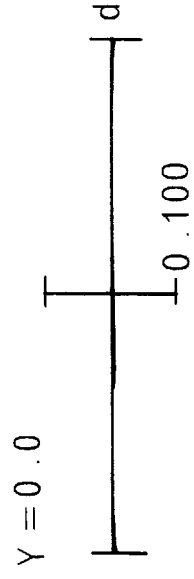
FIG.24

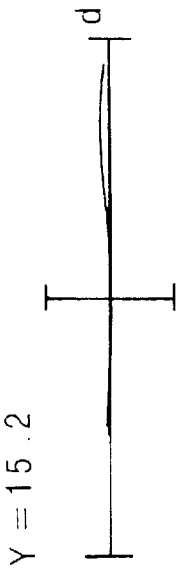 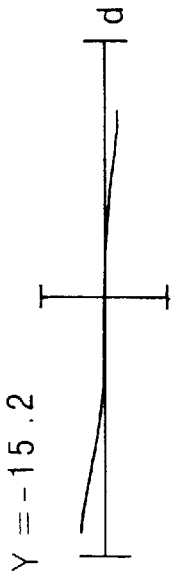 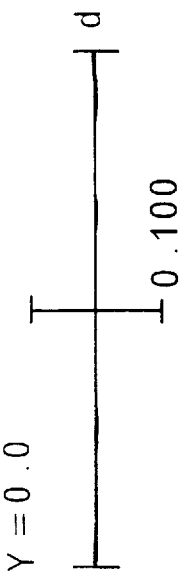
MAXIMUM WIDE-ANGLE STATE     MAXIMUM TELEPHOTO STATE
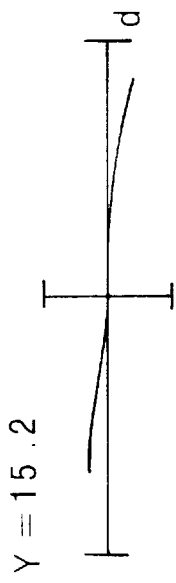 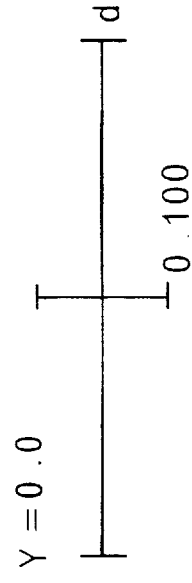
LATERAL CHROMATIC ABERRATION     LATERAL ABERRATION
FIG.25

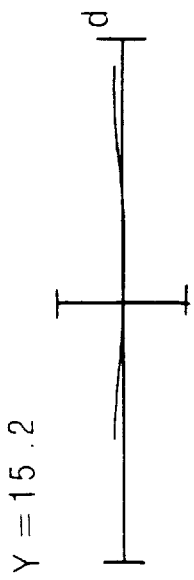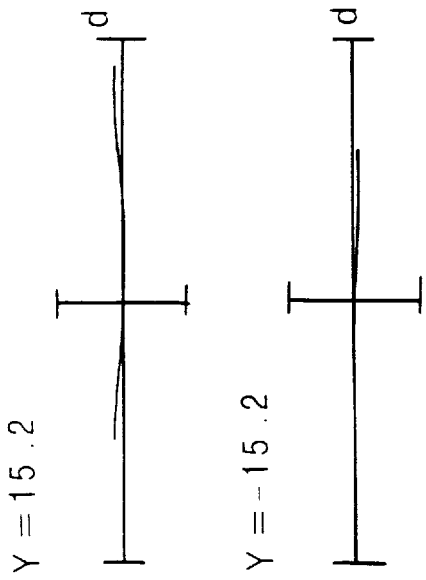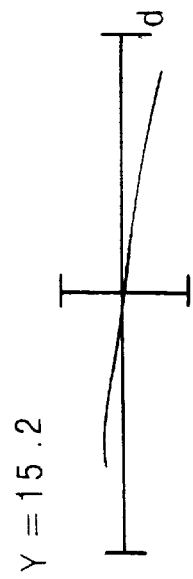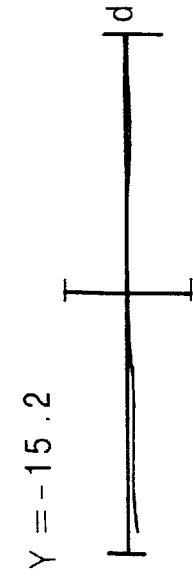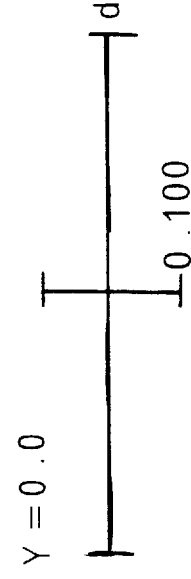
FIG.29
MAXIMUM WIDE-ANGLE STATE
MAXIMUM TELEPHOTO STATE
LATERAL CHROMATIC ABERRATION
LATERAL ABERRATION

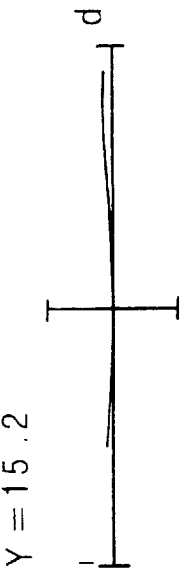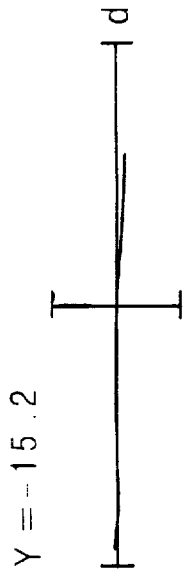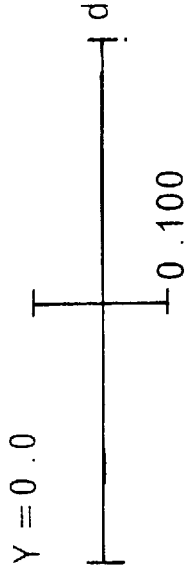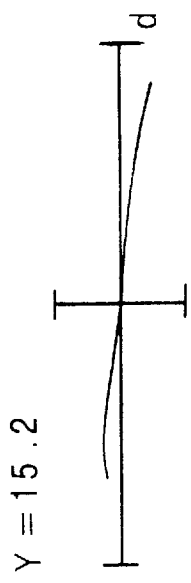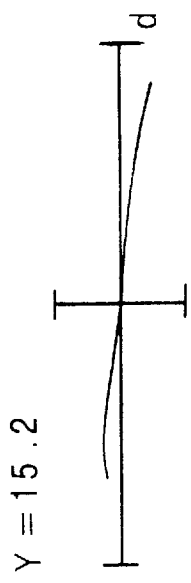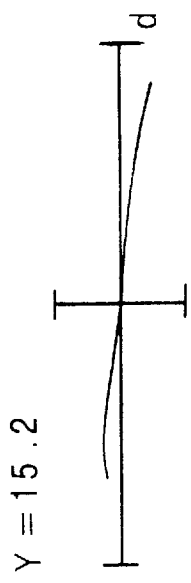
FIG.30

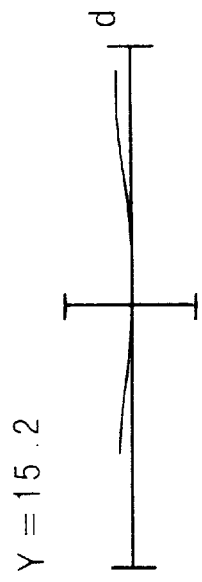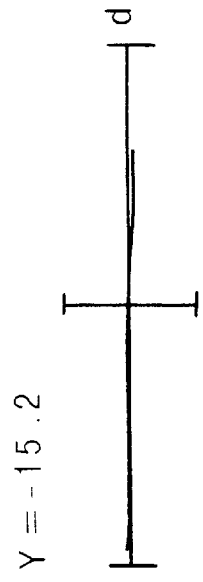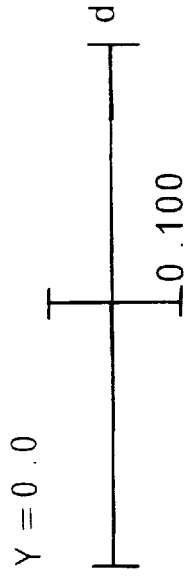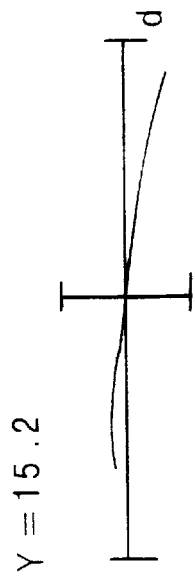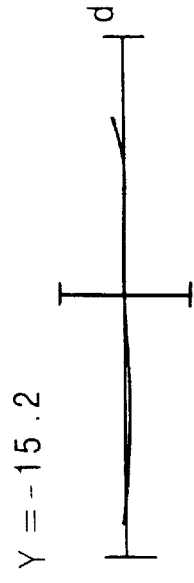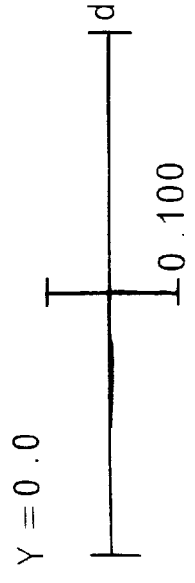
FIG.34

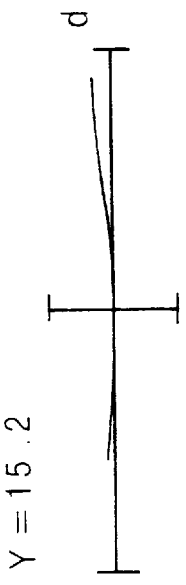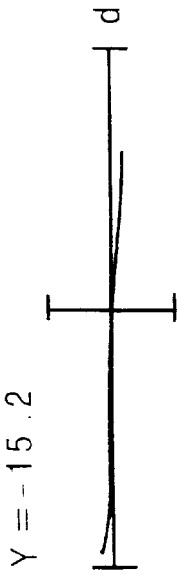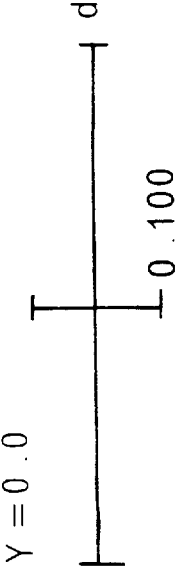
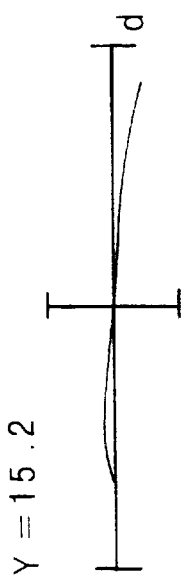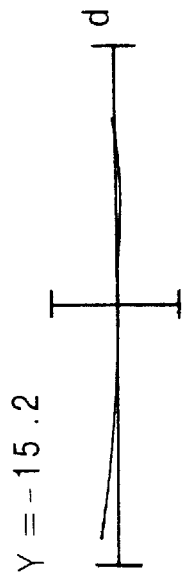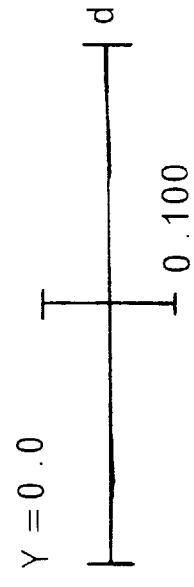
FIG.35

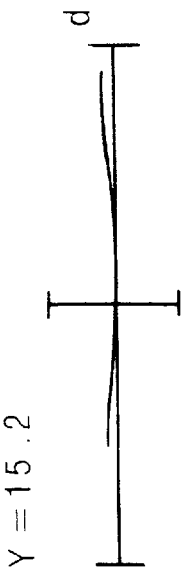
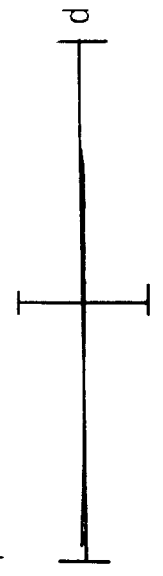
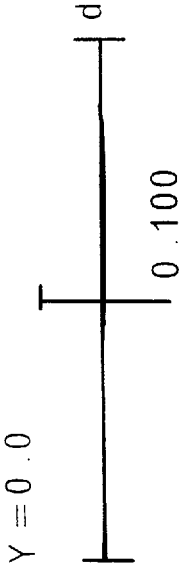
MAXIMUM TELEPHOTO STATE
Y = 15.2
Y = -15.2
Y = 0.0
LATERAL ABERRATION
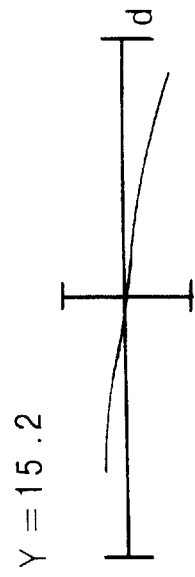
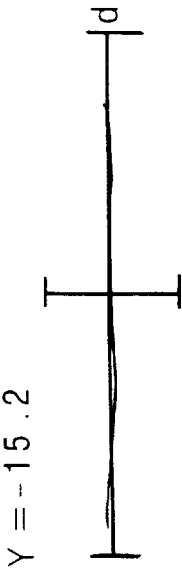
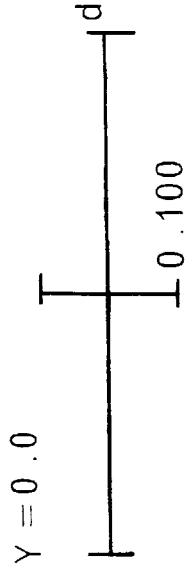
MAXIMUM WIDE-ANGLE STATE
Y = 15.2
Y = -15.2
Y = 0.0
LATERAL CHROMATIC ABERRATION
FIG.39

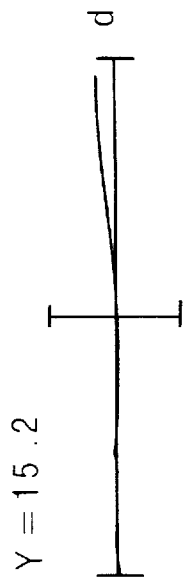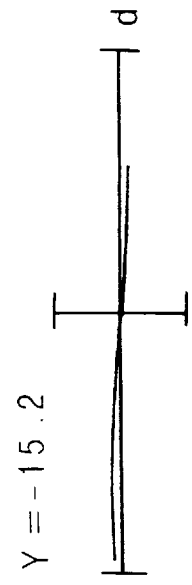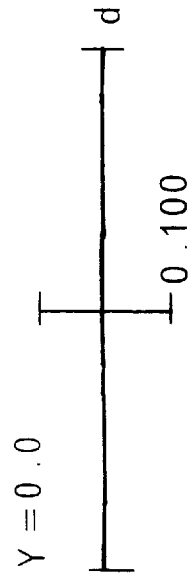
MAXIMUM TELEPHOTO STATE
Y = 15.2
Y = -15.2
Y = 0.0
0.100
LATERAL ABERRATION
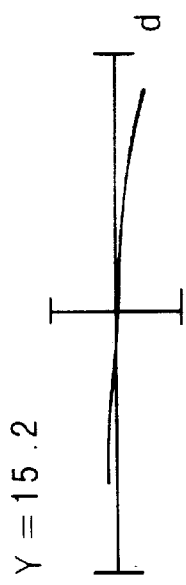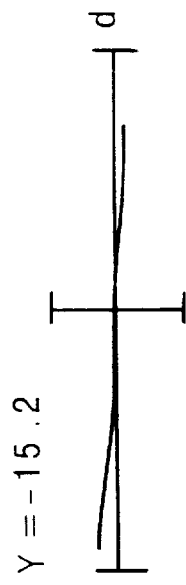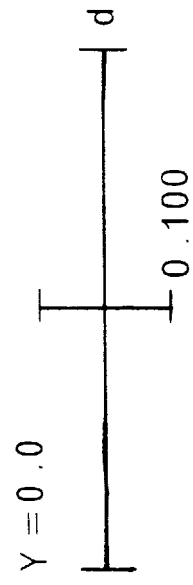
MAXIMUM WIDE-ANGLE STATE
Y = 15.2
Y = -15.2
Y = 0.0
0.100
LATERAL CHROMATIC ABERRATION
FIG.40

ZOOM LENS SYSTEM WITH VIBRATION REDUCTION MEANS

BACKGROUND OF THE INVENTION

The present invention relates to a zoom lens system for photography in 35 mm format and video. More particularly, the present invention relates to a zoom lens system with a vibration-reduction function.

A variety of zoom lenses with a vibration-reduction function have hitherto been proposed. For example, Japanese Kokai patents H1-189621, H1-191112, and H1-191113 disclose a zoom lens system which comprises two or more lens groups intended to correct for shaking a camera during picture taking by moving an arbitrary lens group in a direction perpendicular to the optical axis. This prevents image blur. Alternatively, Japanese Kokai patent H1-284823 discloses a zoom lens system intended to correct for camera shaking by moving a lens unit of a fixed first lens group in a direction perpendicular to the optical axis when performing zooming. In addition, Japanese Kokai H6-130330 discloses a zoom lens intended to correct for camera shaking by moving the entire fourth lens group in a direction perpendicular to the optical axis.

However, these conventional zoom lens systems having a vibration-reduction function do not always provide excellent imaging performance. In addition, some configurations make the entire zoom lens system so big that the zoom lens system is too heavy to be used in a practical manner.

SUMMARY OF THE INVENTION

It is accordingly an object of the present invention to overcome the problems raised by the prior art solutions.

It is another object of the present invention to provide a high performance compact and light zoom lens system incorporating a vibration-reduction function for photography lenses in 35 mm format and video.

In accordance with a preferred embodiment of the present invention, there is provided a zoom lens system having an optical axis and a vibration-reduction function. The system includes in order from an object side:

a first lens group $G_1$ having a positive refractive power;

a second lens group $G_2$ having a negative refractive power;

a third lens group $G_3$ having a negative refractive power;

a fourth lens group $G_4$ having a positive refractive power; and a fifth lens group $G_5$ having a negative refractive power.

When zooming, each of the distances between the first and second lens groups; the second and third lens groups; the third and fourth lens groups; and the fourth and fifth lens groups, respectively, changes. The fourth lens group $G_4$ has a shift lens unit $G_{4P}$ and a first fixed lens unit. The shift lens unit $G_{4P}$ is movable in a direction across the optical axis and has a positive refractive power. The first fixed lens unit is fixed in the direction across the optical axis.

In a further preferred embodiment of the present invention, when zooming from a maximum wide-angle state to a maximum telephoto state, the distance between the first and second lens groups increases while the distance between the fourth and fifth lens groups decreases.

In another embodiment, the fourth lens group of the zoom lens system has a focal length, $f_4$. The shift lens unit has a focal length, $f_{4P}$, and the zoom lens system satisfies the following condition:

$$1.0 < f_{4P}/f_4 < 10.0.$$

In still a further embodiment of the present invention, the first fixed lens unit of the zoom lens system is arranged adjacent the object side of the shift lens unit.

In another embodiment, a second fixed lens unit is provided in the fourth lens group. The second fixed lens unit is arranged adjacent the image side of the shift lens unit fixed in the direction across the optical axis.

In still another embodiment, the second fixed lens unit has a positive refractive power.

In another embodiment of the present invention, the zoom lens system satisfies the following conditions:

$$0.3 < f_1/(f_w \cdot f_T)^{1/2} < 1.5 \quad (1)$$

$$0.2 < D_{W3-4}/f_W < 1.0 \quad (2)$$

$$1.0 < f_{4P}/f_4 < 10.0 \quad (3)$$

where $f_1$ is the focal length of the first lens group $G_1$;

$f_4$ is the focal length of the fourth lens group $G_4$;

$f_w$ is the focal length of the entire zoom lens system at the maximum wide-angle state;

$f_T$ is the focal length of the entire zoom lens system at the maximum telephoto state;

$D_{W3-4}$ is the focal length between the third lens group $G_3$ and the fourth lens group $G_4$ at the maximum wide-angle state; and $f_{4P}$ is the focal length for the lens unit $G_{4P}$ with a vibration-reduction function.

BRIEF DESCRIPTION OF THE DRAWINGS

The above and other objects, features, and advantages of the present invention will become more apparent from the following detailed description taken with respect to the accompanying drawings, in which:

FIG. 19 is a lateral aberration diagram measured in the fourth embodiment during vibration reduction using the shift method;

FIG. 20 is a lateral aberration diagram measured in the fourth embodiment during vibration reduction using the tilt method;

FIG. 24 is a lateral aberration diagram measured in the fifth embodiment during vibration reduction using the shift method;

FIG. 25 is a lateral aberration diagram measured in the fifth embodiment during vibration reduction using the tilt method;

FIG. 29 is a lateral aberration diagram measured in the sixth embodiment during vibration reduction using the shift method;

FIG. 30 is a lateral aberration diagram measured in the sixth embodiment during vibration reduction using the tilt method;

FIG. 34 is a lateral aberration diagram measured in the seventh embodiment during vibration reduction using the shift method;

FIG. 35 is a lateral aberration diagram measured in the seventh embodiment during vibration reduction using the tilt method;

FIG. 39 is a lateral aberration diagram measured in the eighth embodiment during vibration reduction using the shift method; and FIG. 40 is a lateral aberration diagram measured in the eighth embodiment during vibration reduction using the tilt method.

DESCRIPTION OF THE PREFERRED EMBODIMENTS

To be used for photography in the 35 mm format, the zoom lens system incorporating the principles of the present invention basically employs a zoom lens with five groups with positive / negative / negative / positive / negative construction. Features and merits of the zoom lens system of this type are briefly described herein.

The system incorporating the principles of the present invention provides a high-imaging performance compact zoom lens system suitable for greater magnification by taking advantage of, to a large extent, the lens system comprising as many as five positive / negative / negative / positive / negative lens groups.

The entire length of the zoom lens system of this type can be reduced, particularly at the maximum wide-angle state. The fact that the system is constructed with many lens groups, provides a large degree of freedom of distance and the manner in which they move for aberration correction, providing excellent imaging performance even with a large magnification ratio. In such a zoom lens system, the entire length extends during zooming for an arbitrary magnification toward the maximum telephoto state and can reduce both the entire length at the maximum wide-angle state and the entire weight of the zoom lens system compared to the conventional telephoto zoom lens system with a zoom afocal converter. In addition, since the height of light passing through each of the lens groups at the maximum wide-angle state are low, any aberration generated in each of the lens groups decreases. This provides advantageous aberration correction especially at the maximum wide-angle state. Moreover, the fact that there are a number of lens groups increases the degree of freedom in selecting an arbitral refractive power distribution, providing a sufficient back-focus for a single-lens reflex camera.

Figure 1:
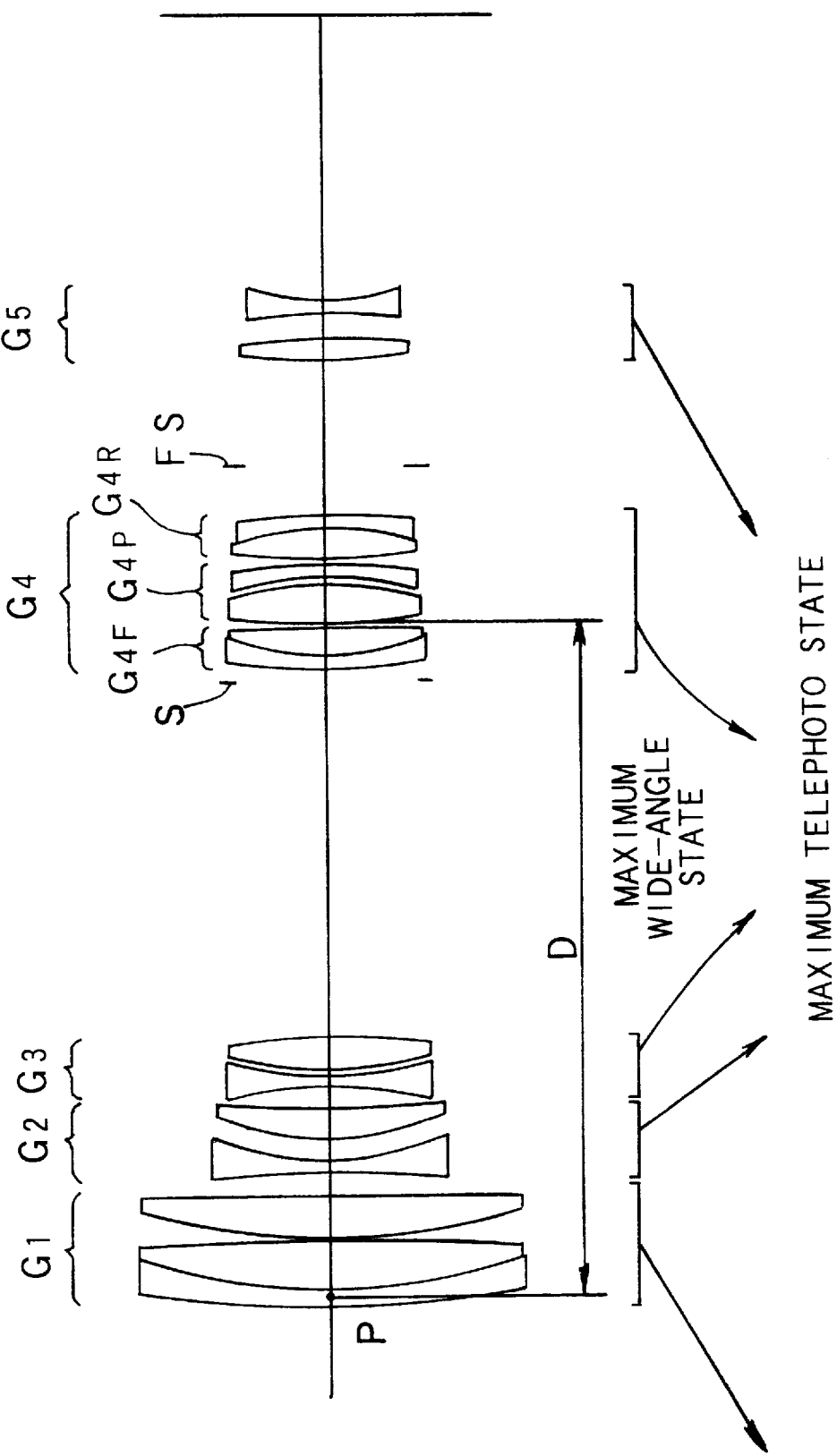
FIG. 1 is a block diagram illustrating a layout of the lenses in a first embodiment of the present invention.

Referring to FIG. 1, the lens layout of the first preferred embodiment is illustrated starting in order from the object side, the system includes a first lens group, $G_1$; a second lens group, $G_2$; a third lens group, $G_3$; a fourth lens group, $G_4$; and a fifth lens group, $G_5$. An aperture stop S is arranged in front of the fourth lens group $G_4$ and a flared stop FS is arranged to the rear of the fourth lens group $G_4$.

Generally, in a zoom lens system, the first lens group $G_1$ is the largest and is moved for focusing. It is not appropriate that the first lens group $G_1$ be used as the vibration-reduction lens group because the holding and drive mechanisms are large. The vibration-reduction lens group changes its position with respect to the optical axis of the system for vibration reduction. Accordingly, the positive / negative / negative / positive / negative of the group $G_1$ of the system is not suitable as a vibration-reduction lens group with a vibration-reduction function.

For the same reason, the para-axial lens group having a large shift amount during varying magnification, such as the fifth lens group $G_5$ of the system, is not suitable as a vibration-reduction lens group; this would make the mechanism complex.

The diameters of the lens groups near the aperture stop S are relatively small since luminous flux correspond to each of the field angles are gathered. Therefore, it is suitable to use these lens groups, which change positions with respect to the optical axis of the system, as the vibration-reduction lens group. This permits the holding and drive mechanisms to be miniaturized, and also, with respect to aberrations, corrects the image position without affecting the center and peripheral resolution.

In order to perform a comparatively large magnification with the 5-group construction, in view of aberration correction, it is preferable that the aperture stop S is positioned in the vicinity of the fourth lens group $G_4$.

For this reason, in the zoom lens system incorporating the principles of the present invention, it is preferable that a lens unit $G_{4P}$ with a vibration-reduction function be placed in the fourth lens group $G_4$. Thus, it is desirable that the aperture stop S is fixed onto the optical axis during compensation being performed by the lens unit $G_{4P}$ with a vibration-reduction function such that it shields unnecessary light.

Also, besides the aperture stop S, during shifting of $G_{4P}$ with vibration-reduction, forming the flared stop FS on the optical axis will shield unneeded light more effectively.

In order to avoid having a zoom lens system of a complex mechanism, when the zoom ratio is not so large, the aperture stop S may be arranged in the third lens group $G_3$ to provide a simple mechanism for the fourth lens group $G_4$ mechanism having a lens unit $G_{4P}$ with vibration-reduction function.

As already noted above, it is preferable that the system incorporating the principles of the present invention satisfies the conditions of each of the following formulae:
where $f_1$ is the focal length of the first lens group $G_1$;

$f_4$ is the focal length of the fourth lens group $G_4$;

$f_w$ is the focal length of the entire zoom lens system at the maximum wide-angle state;

$f_T$ is the focal length of the entire zoom lens system at the maximum telephoto state;

$D_{W3-4}$ is the focal length between the third lens group $G_3$ and the fourth lens group $G_4$ at the maximum wide-angle state.

$f_{4P}$ is a focal length for the lens group with a vibration-reduction function $G_{4P}$ in the fourth lens group $G_4$, $$0.3 < f_1 / (f_w \cdot f_T)^{1/12} < 1.5 \quad (1)$$

$$0.2 < D_{W3-4} / f_W < 1.0 \quad (2)$$

$$1.0 < f_{4P} / f_4 < 10.0 \quad (3)$$

Formula (1) sets forth an appropriate range between the focal length $f_w$ at the maximum wide-angle state of the zoom lens, the focal length $f_T$ at the maximum telephoto state of the zoom lens, and the focal length lens $f_1$ of the first lens group $G_1$. When the value exceeds the upper limit of formula (1), the length at the maximum telephoto state becomes long. This, of course, makes it difficult to keep the system small and provides unfavorable results such as luminous shortage around the maximum telephoto state and a larger front lens diameter. Note that in a preferred embodiment, the upper limit of formula (1) is set to 1.2.

On the other hand, when the value in formula (1) is below the lower limit, the focal length of the first lens group $G_1$ becomes smaller than it should be. This causes insufficient spherical aberration reduction compensation at the maximum telephoto state, substantially changing the curvature of the image plane during zooming. Also, under these conditions, the lens groups after the second lens group $G_2$ from the object side will provide an excessively large magnified image at the maximum telephoto state. This increases the chromatic aberration on the optical axis generated in the first lens group $G_1$, making it impossible to provide excellent imaging performance. Note that, to obtain a better imaging performance, it is preferable that the lower limit of formula (1) be set to 0.6.

Formula (2) is the formula which rules the distance between the third lens group $G_3$ and the fourth lens group $G_4$ at the maximum wide-angle state. Assuming the result of changing only the distance $D_{W3-4}$ while the distances between the other lens groups remain constant, it is apparent that any values exceeding the upper limit of formula (2) will substantially increase spherical and coma aberrations, making aberration correction difficult. This unfavorably increases the lens diameter of the fifth lens group $G_5$ and also the entire length of the zoom lens system.

Alternatively, any values below the lower limit of formula (2) makes it difficult to obtain the needed distance for magnification. This is not suitable for high magnification. Such an arrangement also will generate coma aberration and make it difficult to obtain sufficient back-focus.

Formula (3) defines an appropriate refractive power distribution ratio between the focal lengths of the fourth lens group $G_4$ and the fourth lens unit $G_{4P}$ with a vibration-reduction function. For values exceeding the upper limit of formula (3), the focal length $f_{4P}$ of the lens unit with a vibration-reduction function becomes longer than it should. As a result, particularly during vibration reduction, the spherical aberration is generated on the positive side, which is unfavorable. Also, it increases the shift amount which the fourth lens unit $G_{4P}$ moves eccentrically with respect to the optical axis for vibration-reduction purposes, enlarging and complicating the mechanism, which is unfavorable.

Alternatively, any values below the lower limit excessively reduces the focal length $f_{4P}$ of the lens unit $G_{4P}$ with a vibration-reduction function, providing a large Petzval sum value to the lens unit $G_{4P}$. This unfavorably increases the fluctuation of the aberration during vibration reduction. Particularly unfavorable is the fact that it increases the distance, on peripheries of the image plane, between the best image plane in a meridional direction and the best image plane in a sagittal direction. In addition, it tends to generate spherical aberration on the negative side, which is also unfavorable.

In a preferred embodiment, formula (3) provides the best result when the lower limit is set to 1.5 while the higher limit is set to 8.0.

A system incorporating the principles of the present invention provides excellent imaging and vibration-reduction performance. As shown in FIG. 1, it is preferable that, in order from the object side, the fourth lens group $G_4$ comprises at least a front lens unit $G_{4F}$ having a positive refractive power and a lens unit $G_{4P}$ having a vibration-reduction function. With this construction, a part of the positive refractive power of the entire fourth lens group $G_4$ is shared with the front lens unit $G_{4F}$. This preferably minimizes generating spherical aberration among various aberrations.

The system incorporating the principles of the present invention also provides excellent performance by desirably having, the fourth lens group $G_4$ comprise, in order from the object side, a front lens unit $G_{4F}$ having a positive or negative refractive power, a lens unit $G_{4P}$ with a vibration-reduction function having a positive refractive power, and a rear lens unit $G_{4R}$ having a positive refractive power. It is preferable that this lens system satisfies the conditions of the following formula (4):

$$0.5 < f_{4R} / f_4 < 4.0 \quad (4)$$

where $f_{4R}$ is the focal length of the rear lens unit $G_{4R}$.

Formula (4) defines the refractive power distribution between the fourth lens group $G_4$ and its rear lens unit $G_{4R}$. Any values below the lower limit of formula (4) move the principal point of the fourth lens group $G_4$ to the image side; the distance between the third lens group $G_3$ and the fourth lens group $G_4$ is decreased. Therefore, the distance needed for magnification becomes difficult to obtain. All of these are unfavorable factors when significantly increasing zoom ratio for magnification. Also, among various aberrations, spherical aberration is particularly increasingly generated to a large degree, making it difficult to obtain excellent imaging performance.

Alternatively, for values exceeding the upper limit of formula (4), the chromatic aberration on the optical axis generated in the rear lens unit $G_{4R}$ increases, making it very difficult-if not impossible-to obtain an excellent imaging performance. It also relatively increases the positive refractive power in the front lens unit $G_{4F}$, or decreases the negative refractive power in the front lens unit $G_{4F}$. Therefore, it tends to move the Petzval sum value to the positive side, which is unfavorable.

Note that when actually constructing the rear lens unit $G_{4R}$, it is preferable that it comprises at least a convex and a concave lens. Moreover, it is preferable that the refractive index of the convex lens is lower than that of the concave lens.

When eccentrically moving the lens unit $G_{4P}$ with a vibration-reduction function for vibration reduction, the mechanically simplest method is to move, that is to shift, the lens unit $G_{4P}$ in a direction perpendicular to the optical axis. It is desirable that the system satisfies the conditions of the following formula (5) to obtain excellent vibration reduction performance:

$$\Delta S_{4P}/f_4 < 0.15 \quad (5)$$

where $\Delta S_{4P}$ is the maximum shift amount, during vibration reduction of the lens unit $G_{4P}$ in the fourth lens group $G_4$.

Formula (5) defines an appropriate range for the maximum shift amount $\Delta S_{4P}$ of the lens unit $G_{4P}$. When the value of formula (5) exceeds the upper limit, the maximum shift amount $\Delta S_{4P}$ of the lens unit $G_{4P}$ increases more than it should, as a result, increasing the fluctuation of the aberration during vibration reduction, which is unfavorable.

Especially, such an arrangement will increase the distance in the optical axial direction between the best image plane in the meridional direction and that of the sagittal direction, which is unfavorable. In addition, this unfavorably complicates the system mechanism. An example of a shift type vibration-reducing structure may be found in U.S. Pat. No. 5,416,558 what is hereby incorporated by reference.

Another method for eccentrically moving the lens unit $G_{4P}$ with a vibration-reduction function is to use a rotary movement, that is, a tilt movement in which the lens unit is rotated around a point on the optical axis at a predetermined distance. This can exhibit better vibration-reduction performance. In this case, the lens group should desirably satisfy the conditions of the following formula (6):

$$0.2 < D/f_4 < 30 \quad (6)$$

where D is the distance between the surface closest to the object side, in the lens unit $G_{4P}$ and the rotary center P, shown in FIG. 1.

Any values outside the range of formula (6) make it difficult to obtain the preferred substantial vibration-reduction performance. Particularly, spherical and coma aberrations will change to a large extent during vibration reduction, which is unfavorable. In a preferred embodiment, the lower limit of formula (6) is set to 0.8 and the upper limit is set to 3.5.

In the tilt-type vibration-reduction method, it is preferable, when the rotation angle is W, that $|W|<0.5$ rad minimizes various aberrations. When the rotation angle W exceeds 0.5 rad, particularly on the peripheries of the image plane, the distance between best image plane in a meridional direction and that in a sagittal direction increases, which is unfavorable. The distance between images with and without vibration reduction increases, which is also unfavorable.

An example of a tilt-type vibration reducing structure may be found in U.S. Pat. No. 5,069,537 which is hereby incorporated by reference. Next, to decrease various aberrations generated in the lens unit $G_{4P}$ with a vibration-reduction function, it is desirable that the following conditions (7) and (8) are satisfied where the average refractive index of the positive lens in the lens unit $G_{4P}$ and the average Abbe number is $n_P$ and $v_P$, respectively.

$$n_P > 1.50 \quad (7)$$

$$v_P > 55 \quad (8)$$

When constructing the lens unit $G_{4P}$ from two lens members, it is desirable that it is constructed with a biconvex lens and a concave lens. These two may be arranged spaced in air.

It is also desirable that the lens unit $G_{4P}$ has at least two refractive surfaces having the curvature center on an object side rather than on the diaphragm side.

Regarding the front lens unit $G_{4F}$ having a positive refractive power arranged on the object side of the lens unit $G_{4P}$, it is desirable to satisfy the following formula (9):

$$0.5 < f_{4F}/f_4 < 7.0 \quad (9)$$

where $f_{4F}$ is the focal length of the front lens unit $G_{4F}$ in the fourth lens group $G_4$.

Formula (9) defines the refractive power distribution between the fourth lens group $G_4$ and its front lens unit $G_{4F}$. Any values below the lower limit substantially increases the spherical aberration among various aberrations generated in the front lens unit $G_{4F}$, making aberration correction difficult.

Alternatively, any values exceeding the upper limit of formula (9) relatively increases the positive refractive power of the lens groups other than the front lens unit $G_{4F}$, tending to move the Petzval sum value to the positive side, which is unfavorable.

The second lens group $G_2$ and the third lens group $G_3$ desirably satisfy the conditions of the following formula (10):

$$0.01 \leq (D_{T2-3} - D_{W2-3})/f_W \leq 0.6 \quad (10)$$

where $D_{T2-3}$ is the distance between the second lens group $G_2$ and the third lens group $G_3$ at the maximum telephoto state, and $D_{W2-3}$ is the distance between the second lens group $G_2$ and the third lens group $G_3$ at the maximum wide-angle state.

Formula (10) defines an appropriate ratio for the distance between the second lens group $G_2$ and the third lens group $G_3$ at the wide-angle and maximum telephoto states and the focal distance $f_W$ at the maximum wide-angle state.

Any values exceeding the upper limit not only make the entire length at the maximum telephoto state longer than it should be but also move the image plane curvature both at the maximum wide-angle and maximum telephoto states to the negative side, and also do not sufficiently correct the spherical aberration at the maximum telephoto state. These are unfavorable factors. In a preferred embodiment, the upper limit is set to 0.3 or less.

Any values below the lower limit prevent the third lens group $G_3$ from having a large magnification ratio, making it difficult to evenly distribute aberration loads of each of the lens groups during high magnification or zooming. They also increase the change in various aberration values during zooming. Specifically, they increase the change in image plane curvature and coma aberration, excessively enlarging the image plane curvature towards the negative side at both the maximum wide-angle and the maximum telephoto states. In addition, they generate positive coma aberration at the maximum wide-angle state while excessively compensating the spherical aberration at the maximum telephoto state, which is unfavorable.

When actually constructing the front lens unit $G_{4F}$, at least one convex lens should be used, having a refractive index (the average value to be applied when there are a plurality of convex lenses) preferably of 1.6 or more for aberration correction.

Using lenses with a nonspherical surface (an aspherial surface) or GRIN lenses in the lens unit $G_{4P}$ will provide better vibration reduction.

In addition, when observing a slight image blur during rotation, that is, vibration reduction in the tilt method, these lenses will correct the image blur if combined with an autofocusing function.

Figure 6:
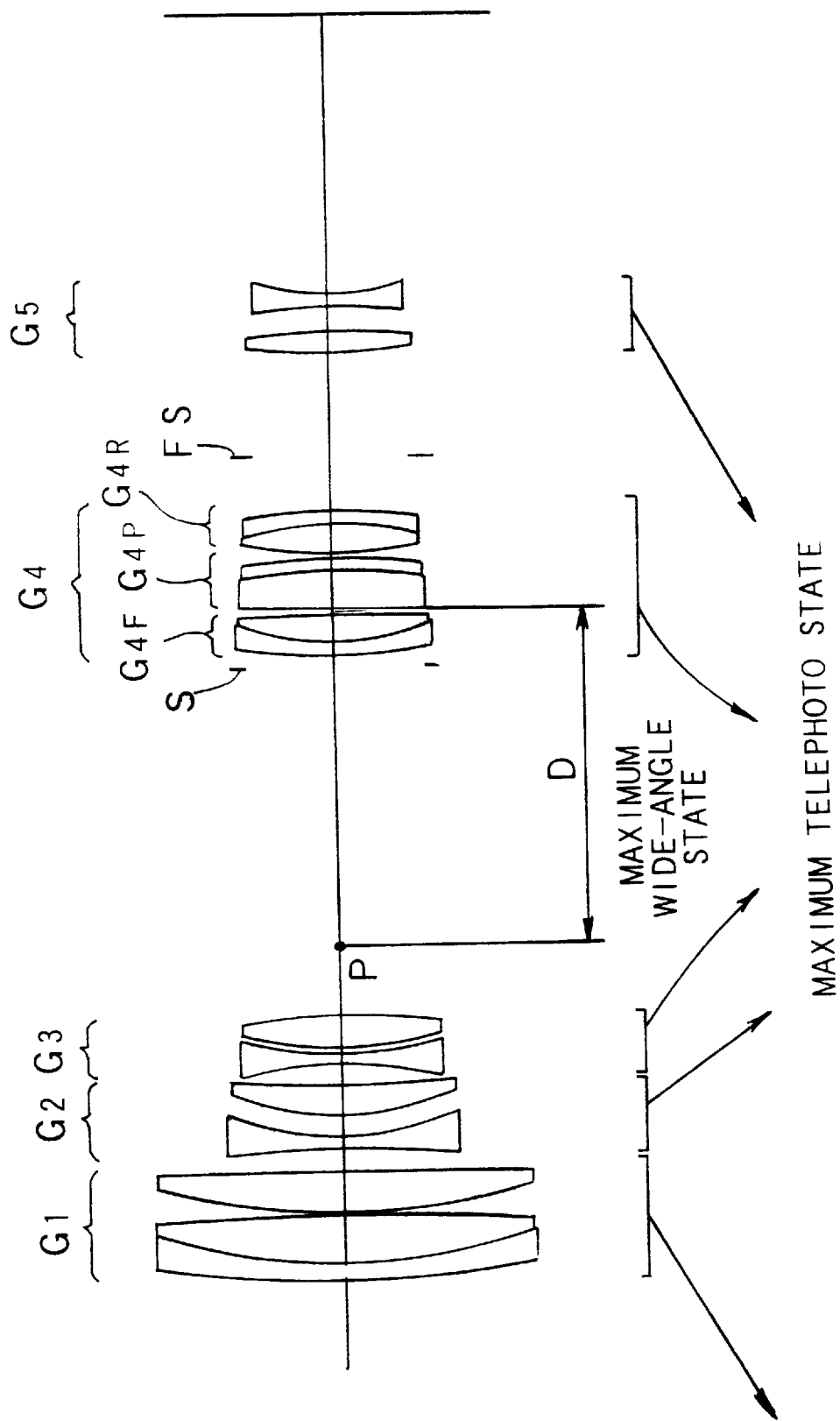
FIG. 6 is a block diagram illustrating a layout of the lenses in a second embodiment of the present invention.
Figure 7:
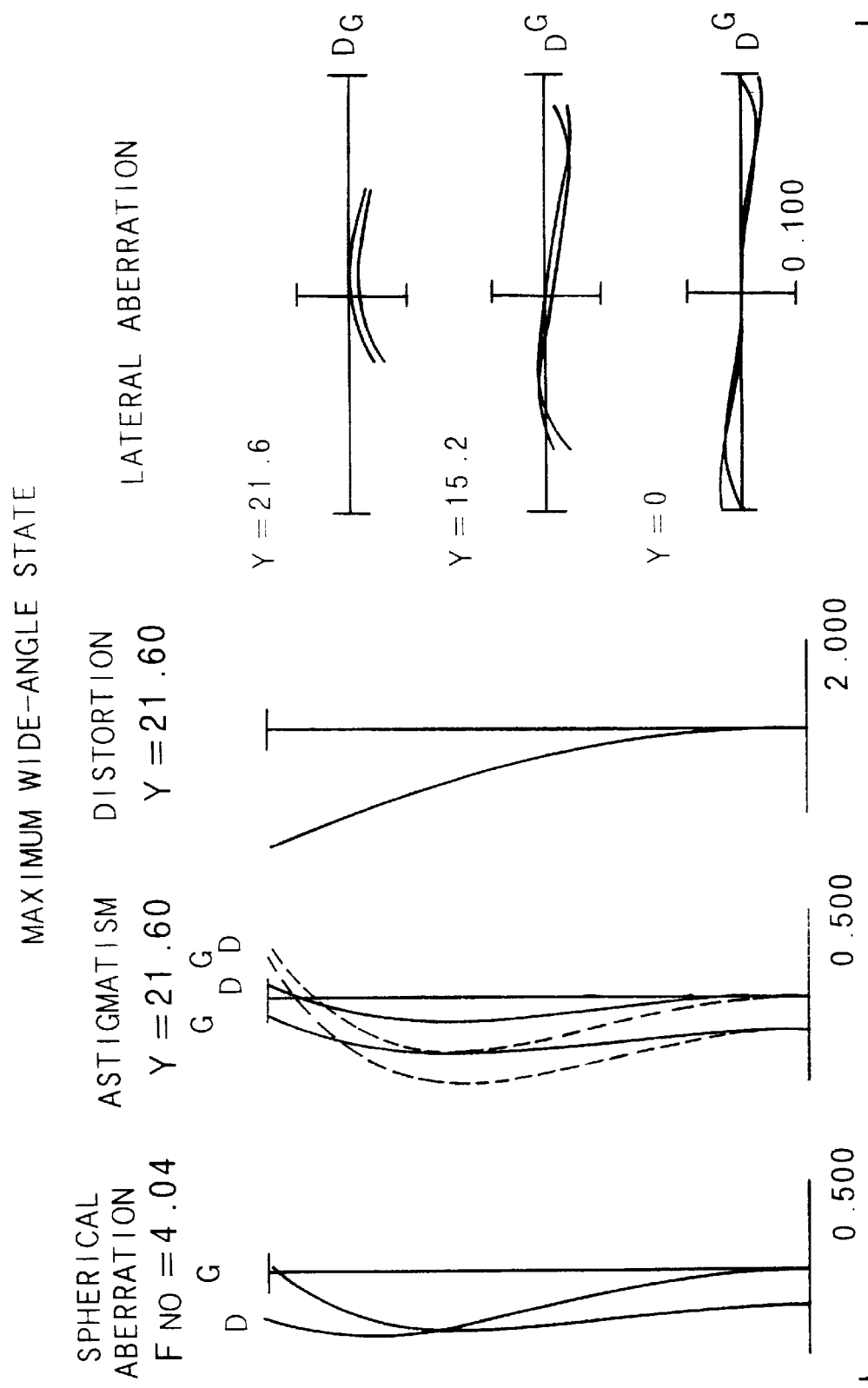
FIG. 7 shows various aberration diagrams at the maximum wide-angle state of the second embodiment.
Figure 8:
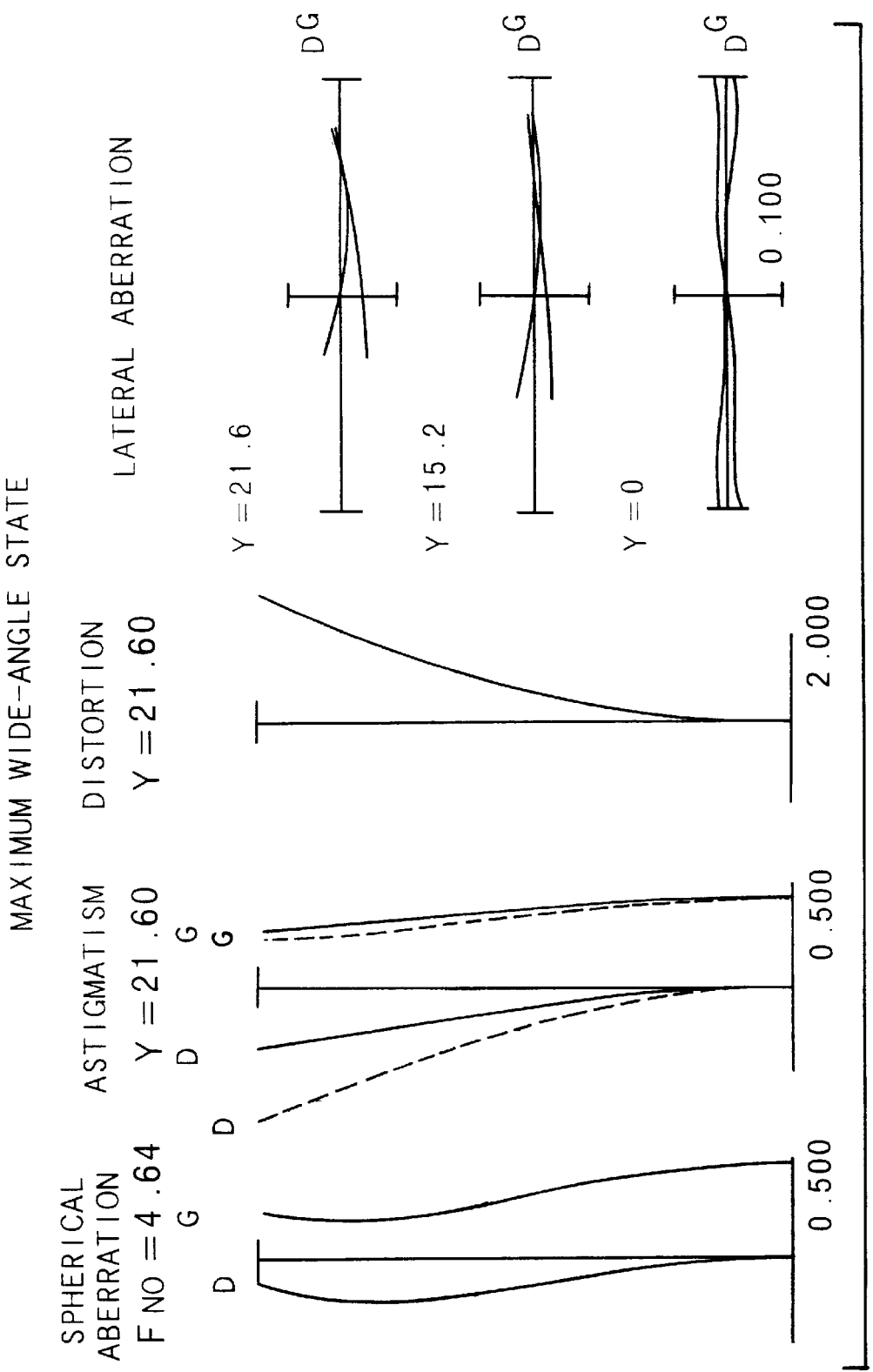
FIG. 8 shows various aberration diagrams at the maximum telephoto state of the second embodiment.
Figure 9:
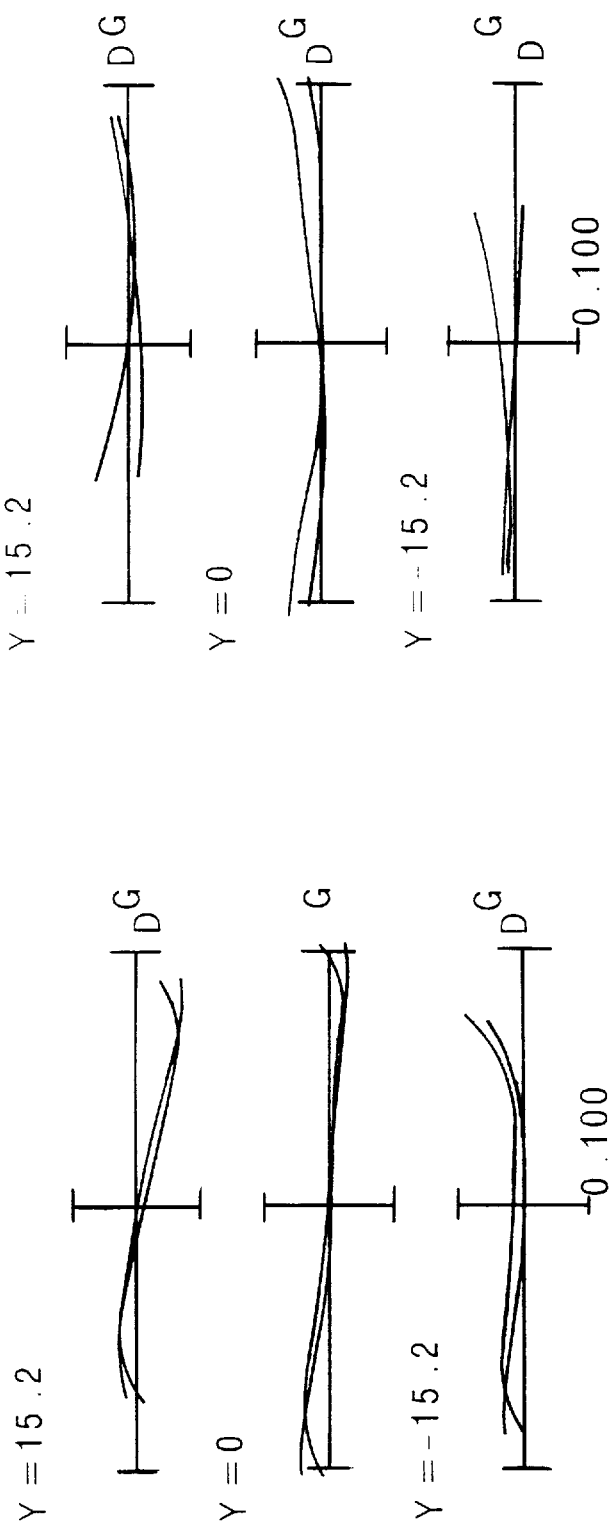
FIG. 9 is a lateral aberration diagram measured in the second embodiment during vibration reduction using the shift method.
Figure 10:
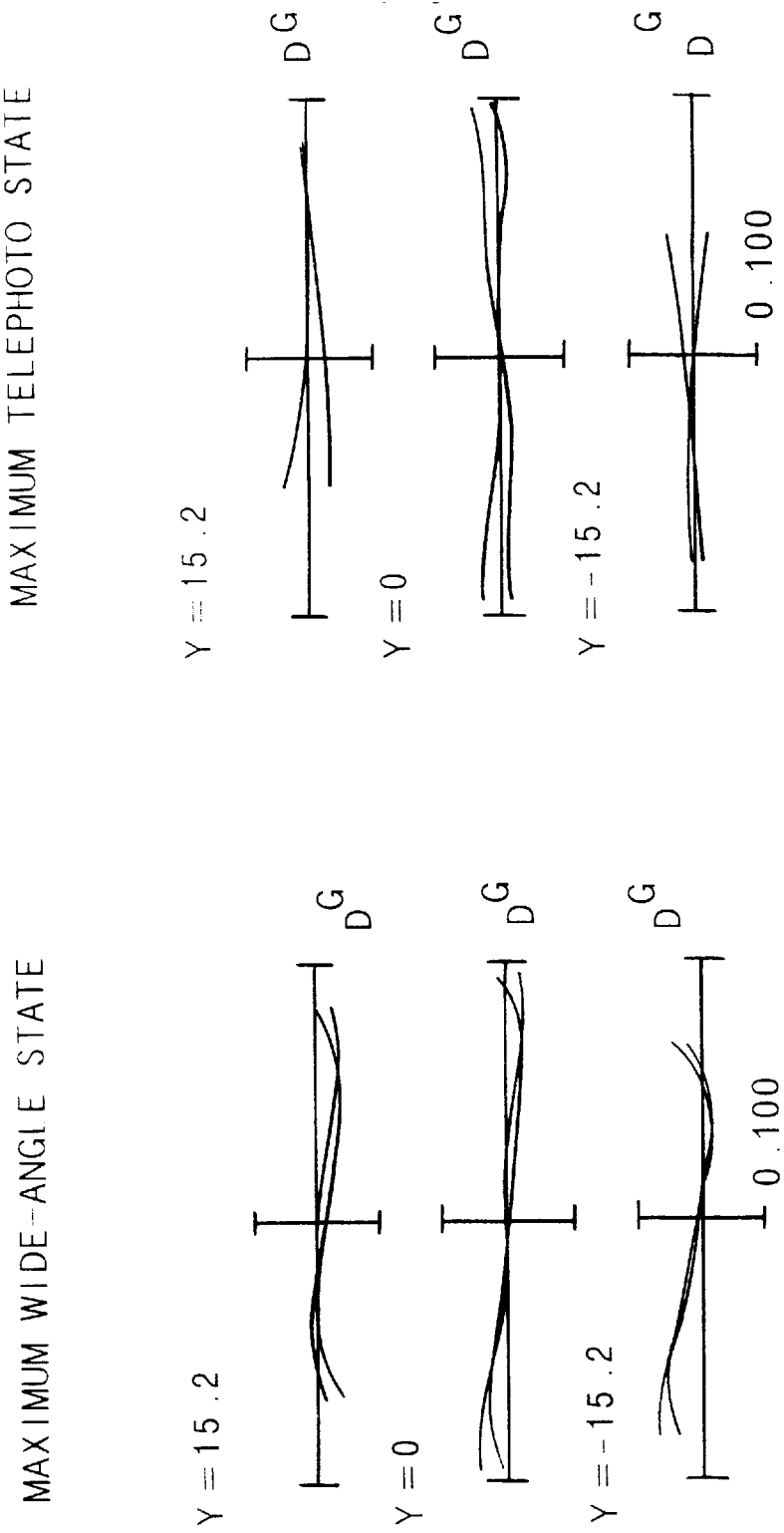
FIG. 10 is a lateral aberration diagram measured in the second embodiment during vibration reduction using the tilt method.
Figure 11:
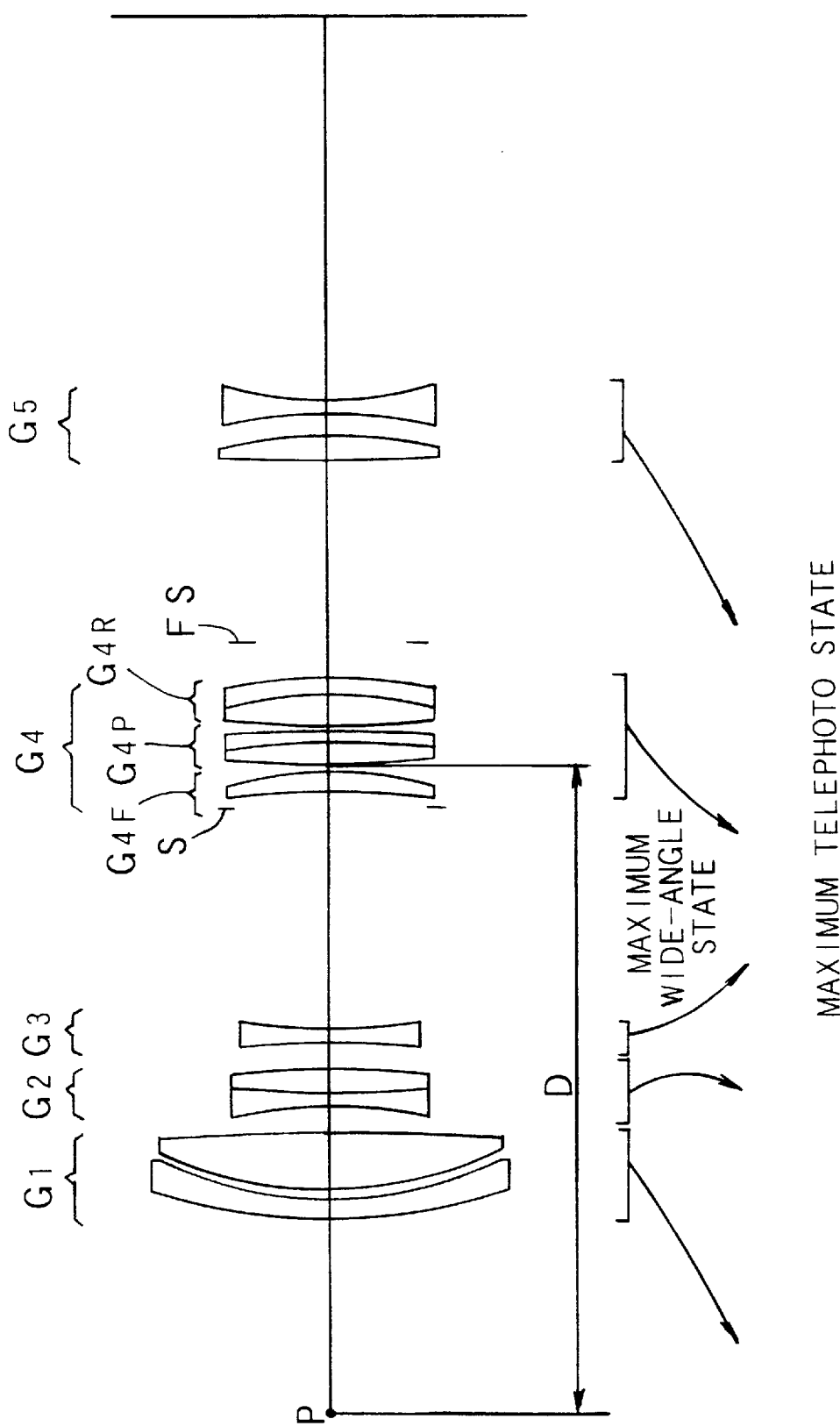
FIG. 11 is a block diagram illustrating a layout of the lenses in a third embodiment of the present invention.
Figure 12:
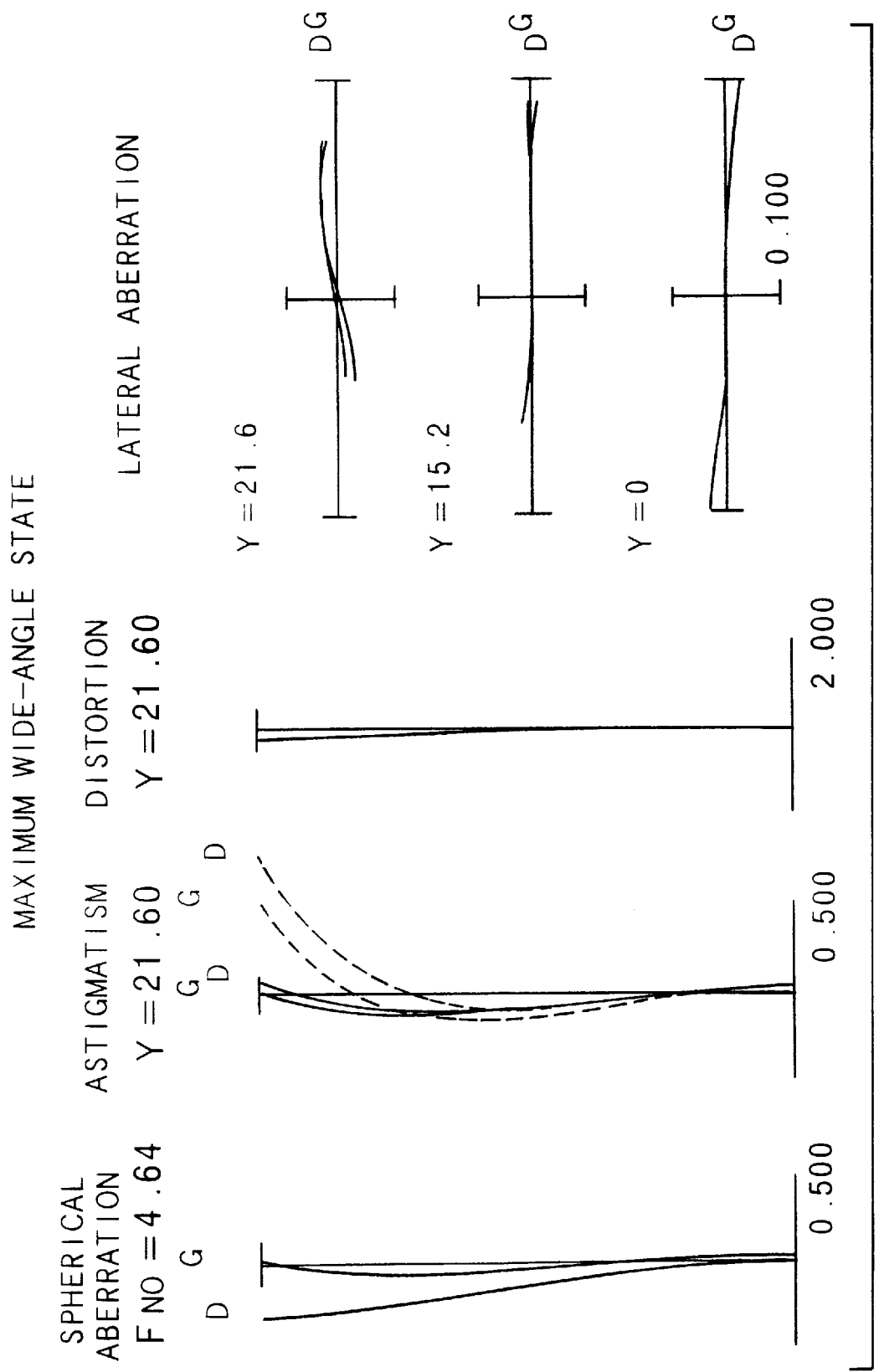
FIG. 12 shows various aberration diagrams at the maximum wide-angle state of the third embodiment.
Figure 13:
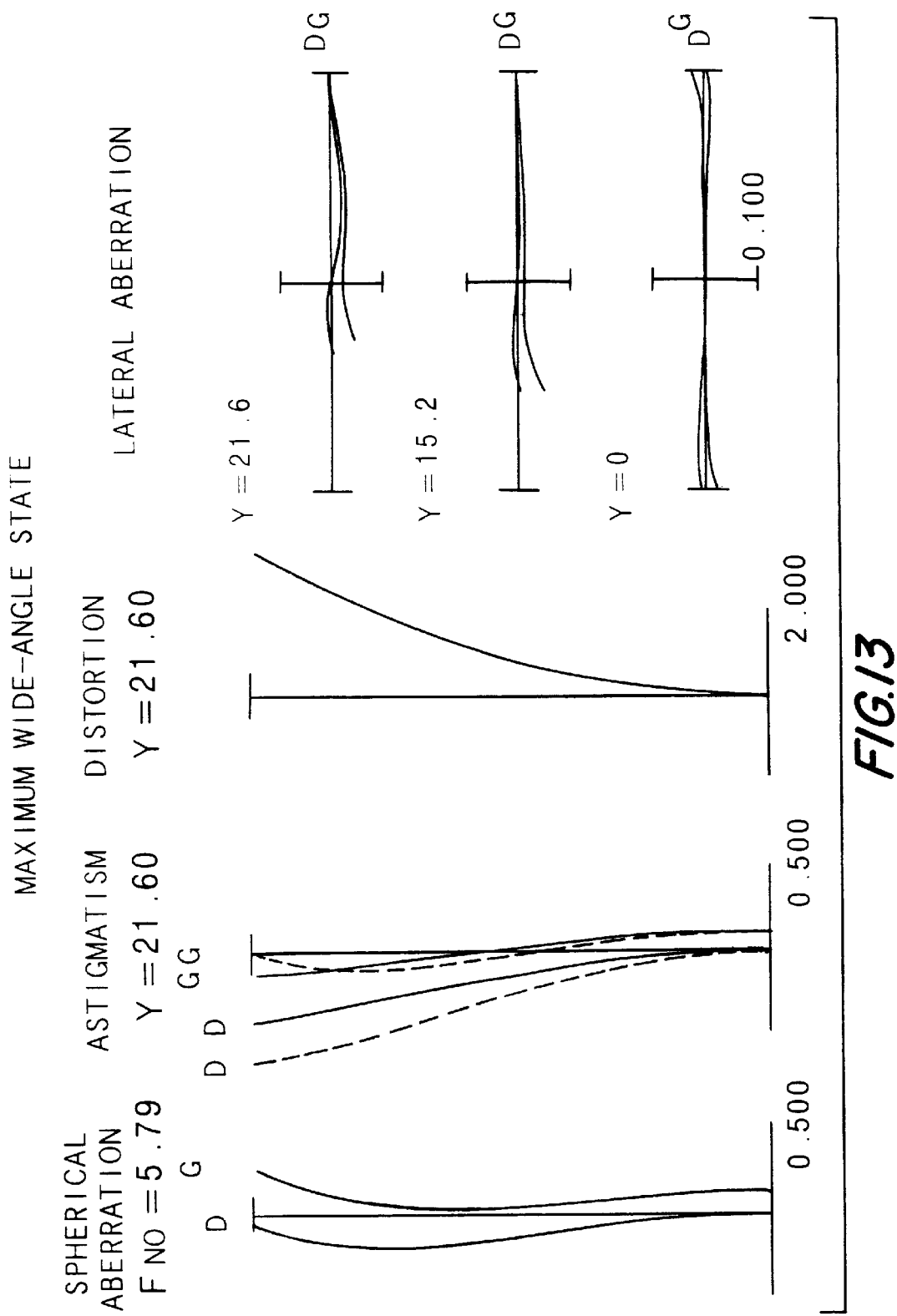
FIG. 13 shows various aberration diagrams at the maximum telephoto state of the third embodiment.
Figure 14:
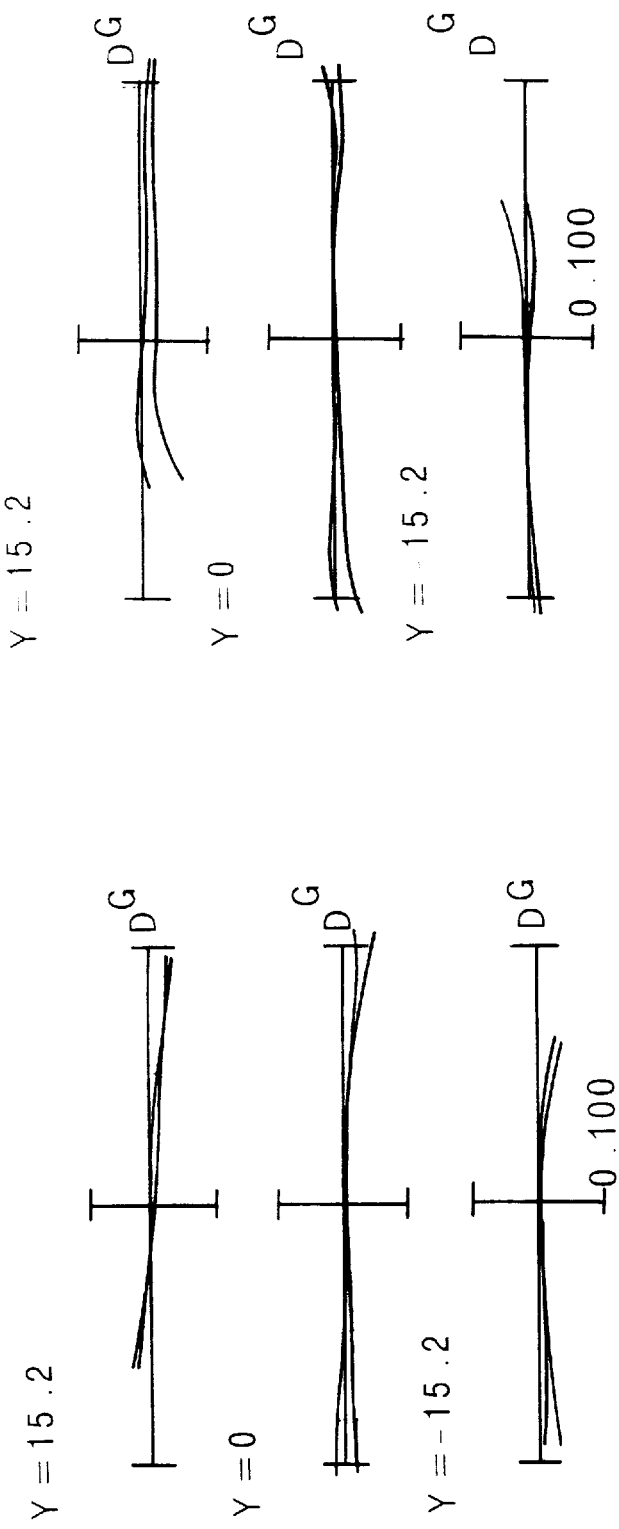
FIG. 14 is a lateral aberration diagram measured in the third embodiment during vibration reduction using the shift method.
Figure 15:
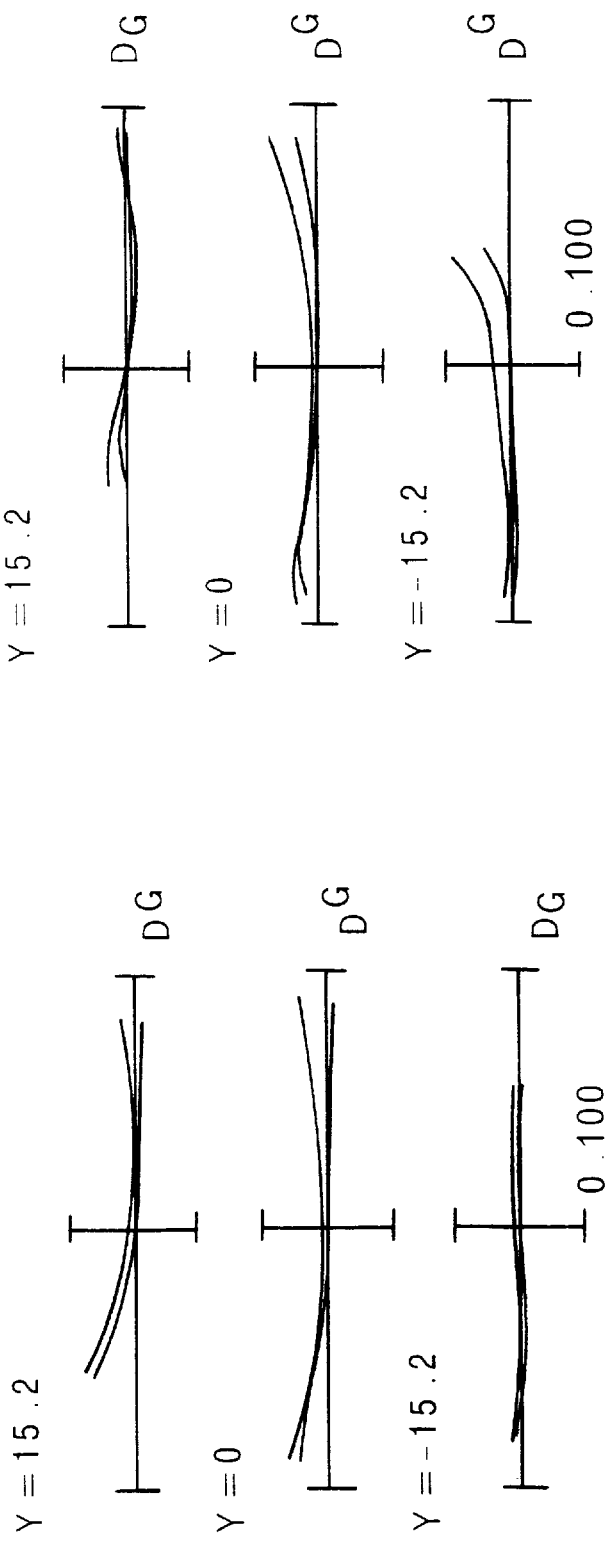
FIG. 15 is a lateral aberration diagram measured in the third embodiment during vibration reduction using the tilt method.

FIGS. 1, 6, and 11, respectively, illustrate the first through third embodiments of a zoom lens system incorporating the principles of the present invention; wherein provided in each of the embodiments, in order from the object side is a first lens group $G_1$ having a positive refractive power, a second lens group $G_2$ having a negative refractive power, a third lens group $G_3$ having a negative refractive power, a fourth lens group $G_4$ having a positive refractive power, and a fifth lens group $G_5$ having a negative refractive power. With this zoom lens system, when zooming, the lens groups are moved such that the distance between the first lens group $G_1$ and the second lens group $G_2$ increases; the distance between the second lens group $G_2$ and the third lens group $G_3$ varies linearly or nonlinearly, the distance between the fourth lens group $G_4$ and the fifth lens group $G_5$ decreases.

The fourth lens group $G_4$ comprises, in order from the object side, a front lens unit $G_{4F}$ having a positive refractive power, a lens unit $G_{4P}$ with a vibration-reduction function having a positive refractive power, and a rear lens unit $G_{4R}$ having a positive refractive power. Vibration reduction is performed by eccentrically moving the lens unit $G_{4P}$ with respect to the optical axis.

Values for the first through third embodiments are respectively shown in Tables 1 through 3 herein. The "Values of the Items" table for each embodiment shows each of the focal lengths of the entire system; $F_{NO}$ is the F-number and 2 ω is the field angle. In the "Data of Lenses" table in each of the tables, the first column shows the lens surface number from an object side; the second column, r, shows the radius of curvature of each of the lens surface's focal lengths of the entire system; the third column, d, shows the lens surface separation; the fourth column, v, is the Abbe number of each of the lenses; the fifth and sixth column, $n_d$ and $n_g$, are refractive indices based on the d-line (λ=587.6 nm) and the g-line (λ=435.8 nm) of each of the lenses; and the seventh column shows the lens group numbers; Bf shows back-focus.

In the "Variable Separation In Zooming" table, $d_O$ shows the distance between an object point and most object-side lens surface of the zoom lens. In the "Shift-Type Vibration-Reduction Data" table, the shift amount $\Delta S_{4P}$ in the lens unit $G_{4P}$ defines the upper level on the optical path diaphragms as a positive zone.

In the "Tilt-Type Vibration-Reduction Data" table, the rotation angle W in the lens unit $G_{4P}$ defines the area in the clockwise direction as the positive zone. Between the two types of data, the movement amount of the image shift amount defines the upper level on the optical path diaphragm as the positive zone.

Each of the embodiments comprises a flare diaphragm FS besides a aperture stop S. The flare diaphragm FS is fixed onto the optical axis during eccentric movement of the lens unit $G_{4P}$. The location of the flare diaphragm in each of the embodiments is as follows: in the first embodiment, at the maximum wide-angle state, 7.5 mm behind the fourth lens group $G_4$ while at the maximum telephoto state, 0.2 mm behind the fourth lens group $G_4$. In the second embodiment, at the maximum wide-angle state, 7.5 mm behind the fourth lens group $G_4$ while at the maximum telephoto state, 0.2 mm behind the fourth lens group $G_4$. In the third embodiment, at the maximum wide-angle state, 4.0 mm behind the fourth lens group $G_4$ while at the maximum telephoto state, 0.5 mm behind the fourth lens group $G_4$.

TABLE 1

(First Embodiment)

Values of the Items in the First Embodiment: Entire System and Group f = 76.558–285.000, $F_{No}$ = 4.03–5.37, 2W = 33.6°–8.6°
$f_W$ = 71.558          $f_T$ = 285.000
$f_1$ = 147.118         $f_4$ = 46.220
$f_{4F}$ = 141.246      $f_{4P}$ = 149.867      $f_{4R}$ = 106.167

Data of lenses (First Embodiment)

| Number | r | d | v | $n_d$ | $n_g$ | |
|---|---|---|---|---|---|---|
| 1 | 216.6359 | 2.2000 | 33.89 | 1.803840 | 1.834635 | $G_1$ |
| 2 | 90.2075 | 6.8000 | 82.52 | 1.497820 | 1.505265 | $G_1$ |
| 3 | −566.1523 | 0.4000 | | | | |
| 4 | 95.2785 | 5.8000 | 64.10 | 1.516800 | 1.526703 | $G_1$ |
| 5 | −2489.0437 | ($d_5$) | | | | |
| 6 | −179.9006 | 1.7000 | 40.90 | 1.796310 | 1.821068 | $G_2$ |
| 7 | 45.5568 | 2.5000 | | | | |
| 8 | 36.4997 | 4.6000 | 29.46 | 1.717360 | 1.749224 | $G_2$ |
| 9 | 161.4648 | ($d_9$) | | | | |
| 10 | −61.5064 | 1.5000 | 40.90 | 1.796310 | 1.821068 | $G_3$ |
| 11 | 53.1262 | 0.9000 | | | | |
| 12 | 68.6631 | 4.4000 | 29.46 | 1.717360 | 1.749224 | $G_3$ |
| 13 | −101.7493 | ($d_{13}$) | | | | |
| 14 | (diaphragm) | 1.5000 | | | | |
| 15 | 64.1363 | 2.0000 | 33.89 | 1.803840 | 1.834635 | $G_{4F}$ |
| 16 | 32.0804 | 4.0000 | 54.01 | 1.617200 | 1.631485 | $G_{4F}$ |
| 17 | −2109.5909 | 0.8000 | | | | |
| 18 | 122.3555 | 5.5000 | 60.03 | 1.640000 | 1.653133 | $G_{4P}$ |
| 19 | −49.3323 | 1.0000 | | | | |
| 20 | −48.7159 | 1.5000 | 39.82 | 1.869940 | 1.897730 | $G_{4P}$ |
| 21 | −141.6553 | 0.8000 | | | | |
| 22 | 93.7199 | 4.5000 | 57.03 | 1.622801 | 1.636391 | $G_{4R}$ |
| 23 | −38.9518 | 1.5000 | 33.89 | 1.803840 | 1.834635 | $G_{4R}$ |
| 24 | −107.3677 | ($d_{24}$) | | | | |
| 25 | 187.3634 | 3.0000 | 27.83 | 1.699110 | 1.732332 | $G_5$ |
| 26 | −71.4122 | 3.6000 | | | | |
| 27 | −65.2769 | 1.5000 | 49.45 | 1.772789 | 1.792324 | $G_5$ |
| 28 | 32.7254 | (Bf) | | | | |

TABLE 1-continued (First Embodiment)

Variable Separation in Zooming
(First Embodiment)

|  | Maximum wide-angle state | Maximum telephoto state |
|---|---|---|
| $d_0$ | ∞ | ∞ |
| $d_5$ | 3.31848 | 68.43003 |
| $d_9$ | 3.14532 | 7.71942 |
| $d_{13}$ | 50.38037 | 2.41525 |
| $d_{24}$ | 22.26586 | 0.54533 |
| Bf | 40.30900 | 92.24300 |

Shift-Type Vibration-Reduction Data
(First Embodiment)

|  | | |
|---|---|---|
| Shift amount $\Delta S_{4P}$ (mm) of the lens unit $G_{4P}$ with vibration-reduction function | 1.000 | 1.000 |
| Moving amount of the image (mm) | +0.68975 | +0.90831 |

Tilt-Type Vibration-Reduction Data (D = 96)
(First Embodiment)

|  | | |
|---|---|---|
| Rotation angle W (rad) of the lens unit $G_{4P}$ with vibration-reduction function | +0.008727 | +0.008727 |
| Moving amount of the image (mm) | −0.597 | −0.800 |

TABLE 2

(Second Embodiment)

Values of the Items in the Second Embodiment: Entire System and Group $f = 71.558\text{--}292.000$, $F_{No} = 4.04\text{--}5.51$, $2\omega = 33.6°\text{--}8.5°$
$f_W = 71.558$  $f_T = 292.000$
$f_1 = 147.118$  $f_4 = 46.220$
$f_{4F} = 88.954$  $f_{4P} = 358.993$  $f_{4R} = 113.117$

Data of lenses (Second Embodiment)

| Number | r | d | ν | $n_d$ | $n_g$ | |
|---|---|---|---|---|---|---|
| 1 | 218.5208 | 2.2000 | 33.89 | 1.803840 | 1.834635 | $G_1$ |
| 2 | 89.1647 | 6.8000 | 82.52 | 1.497820 | 1.505265 | $G_1$ |
| 3 | −616.2205 | 0.4000 | | | | |
| 4 | 94.7992 | 5.8000 | 64.10 | 1.516800 | 1.526703 | $G_1$ |
| 5 | −1595.7825 | ($d_5$) | | | | |
| 6 | −194.5494 | 1.7000 | 40.90 | 1.796310 | 1.821068 | $G_2$ |
| 7 | 45.8306 | 2.5000 | | | | |
| 8 | 35.6560 | 4.6000 | 29.46 | 1.717360 | 1.749224 | $G_2$ |
| 9 | 150.6743 | ($d_9$) | | | | |
| 10 | −60.6930 | 1.5000 | 40.90 | 1.796310 | 1.821068 | $G_3$ |
| 11 | 53.7211 | 0.9000 | | | | |
| 12 | 69.4728 | 4.4000 | 29.46 | 1.717360 | 1.749224 | $G_3$ |
| 13 | −100.0553 | ($d_{13}$) | | | | |
| 14 | (diaphragm) | 1.5000 | | | | |
| 15 | 64.3911 | 2.0000 | 33.89 | 1.803840 | 1.834635 | $G_{4F}$ |
| 16 | 36.2299 | 4.0000 | 60.64 | 1.603110 | 1.615404 | $G_{4F}$ |
| 17 | −138.3740 | 0.8000 | | | | |
| 18 | 982.0967 | 5.5000 | 60.69 | 1.563840 | 1.575310 | $G_{4P}$ |
| 19 | −72.2576 | 1.5000 | 45.00 | 1.744000 | 1.764871 | $G_{4P}$ |
| 20 | −158.2483 | 0.8000 | | | | |
| 21 | 73.7868 | 4.5000 | 60.64 | 1.603110 | 1.615404 | $G_{4R}$ |
| 22 | −39.8805 | 1.5000 | 33.89 | 1.803840 | 1.834635 | $G_{4R}$ |
| 23 | −140.2482 | ($d_{23}$) | | | | |
| 24 | 195.1388 | 3.0000 | 27.83 | 1.699110 | 1.732332 | $G_5$ |
| 25 | −74.7013 | 3.6000 | | | | |
| 26 | −70.3422 | 1.5000 | 49.45 | 1.772789 | 1.792674 | $G_5$ |
| 27 | 32.5003 | (Bf) | | | | |

TABLE 2-continued (Second Embodiment)

Variable Separation in Zooming
(Second Embodiment)

|  | Maximum wide-angle state | Maximum telephoto state |
|---|---|---|
| $d_0$ | ∞ | ∞ |
| $d_5$ | 3.08398 | 70.01885 |
| $d_9$ | 3.58173 | 6.86520 |
| $d_{13}$ | 50.67682 | 3.16130 |
| $d_{23}$ | 22.89455 | 0.19173 |
| Bf | 40.20100 | 92.32330 |

Shift-Type Vibration-Reduction Data
(Second Embodiment)

|  | | |
|---|---|---|
| Shift amount $\Delta S_{4P}$ (mm) of the lens unit $G_{4P}$ with vibration-reduction function | 1.000 | 1.000 |
| Image shift amount (mm) | +0.28000 | +0.36200 |

Tilt-Type Vibration-Reduction Data (D = 49)
(Second Embodiment)

|  | | |
|---|---|---|
| Rotation angle W (rad) of the lens unit $G_{4P}$ with vibration-reduction function | +0.017453 | +0.017453 |
| Image shift amount (mm) | −0.300 | −0.415 |

TABLE 3

(Third Embodiment)

Values of the Items in the Third Embodiment: Entire System and Group $f = 82.195\text{--}196.000$, $F_{No} = 4.64\text{--}5.79$, $2\omega = 29.5°\text{--}12.6°$
$f_W = 82.195$  $f_T = 196.000$
$f_1 = 107.998$  $f_4 = 41.000$
$f_{4F} = 82.688$  $f_{4P} = 264.931$  $f_{4R} = 110.361$

Data of lenses (Third Embodiment)

| Number | r | d | ν | $n_d$ | $n_g$ | |
|---|---|---|---|---|---|---|
| 1 | 62.7137 | 2.2000 | 23.01 | 1.860741 | 1.910649 | $G_1$ |
| 2 | 42.8730 | 1.2000 | | | | |
| 3 | 44.9698 | 6.2000 | 60.64 | 1.603110 | 1.615404 | $G_1$ |
| 4 | −291.1748 | ($d_4$) | | | | |
| 5 | −43.7931 | 1.4000 | 49.45 | 1.772789 | 1.792324 | $G_2$ |
| 6 | 141.7791 | 2.6000 | 25.50 | 1.804581 | 1.846310 | $G_2$ |
| 7 | −76.2257 | ($d_7$) | | | | |
| 8 | −149.6697 | 1.5000 | 60.03 | 1.640000 | 1.653133 | $G_3$ |
| 9 | 73.7365 | ($d_9$) | | | | |
| 10 | (diaphragm) | 1.6000 | | | | |
| 11 | −116.9996 | 2.5000 | 52.30 | 1.748099 | 1.765893 | $G_{4F}$ |
| 12 | −40.8348 | 0.5000 | | | | |
| 13 | 93.9323 | 2.5000 | 64.10 | 1.516800 | 1.526703 | $G_{4P}$ |
| 14 | −87.2012 | 1.0000 | 35.19 | 1.749501 | 1.776948 | $G_{4P}$ |
| 15 | −808.5178 | 0.5000 | | | | |
| 16 | 68.4515 | 3.8000 | 64.10 | 1.516800 | 1.526703 | $G_{4R}$ |
| 17 | −39.8429 | 1.5000 | 23.01 | 1.860741 | 1.910649 | $G_{4R}$ |
| 18 | −84.6755 | ($d_{18}$) | | | | |
| 19 | 1176.0839 | 2.5000 | 25.80 | 1.784721 | 1.825015 | $G_5$ |
| 20 | −52.3781 | 2.4000 | | | | |
| 21 | −57.7800 | 1.5000 | 47.47 | 1.787971 | 1.808793 | $G_5$ |
| 22 | 38.5397 | (Bf) | | | | |

TABLE 3-continued (Third Embodiment)

Variable Separation in Zooming
(Third Embodiment)

|  | Maximum wide-angle state | Maximum telephoto state |
|---|---|---|
| $d_0$ | ∞ | ∞ |
| $d_4$ | 3.02744 | 40.55186 |
| $d_7$ | 2.66182 | 8.23079 |
| $d_9$ | 24.14781 | 3.01538 |
| $d_{18}$ | 24.09037 | 2.12941 |
| Bf | 41.79100 | 79.31540 |

Shift-Type Vibration-Reduction Data
(Third Embodiment)

|  | Maximum wide-angle state | Maximum telephoto state |
|---|---|---|
| Shift amount $\Delta S_{4P}$ (mm) of the lens unit $G_{4P}$ with vibration-reduction function | 1.000 | 1.000 |
| Image shift amount (mm) | +0.37397 | +0.41453 |

Tilt-Type Vibration-Reduction Data (D = 70)
(Third Embodiment)

|  | Maximum wide-angle state | Maximum telephoto state |
|---|---|---|
| Rotation angle W (rad) of the lens unit $G_{4P}$ with vibration-reduction function | +0.034907 | +0.034907 |
| Image shift amount (mm) | −0.70749 | −0.80015 |

In the following Table 4, the parameters for formulae (1) through (10) are provided for each embodiment:

TABLE 4

|  | Embodiment Number | | |
|---|---|---|---|
|  | 1 | 2 | 3 |
| (1) $f_1/f_W \cdot f_T)^{1/2}$ | 1.030 | 1.017 | 0.851 |
| (2) $D_{W3-4}/f_W$ | 0.704 | 0.708 | 0.294 |
| (3) $f_{4P}/f_4$ | 3.242 | 7.767 | 6.462 |
| (4) $f_{4R}/f_4$ | 2.297 | 2.447 | 2.692 |
| (5) $\Delta S_{4P}/f_4$ | 0.0216 | 0.022 | 0.024 |
| (6) $D/f_4$ | 2.077 | 1.060 | 1.707 |
| (7) $n_P$ | 1.64000 | 1.56384 | 1.51680 |
| (8) $\nu_P$ | 60.030 | 60.690 | 64.100 |
| (9) $f_{4F}/f_4$ | 3.056 | 1.925 | 2.0167 |
| (10) $(D_{T2-3} - D_{W2-3})/f_W$ | 0.0639 | 0.0459 | 0.0678 |

Figure 2:
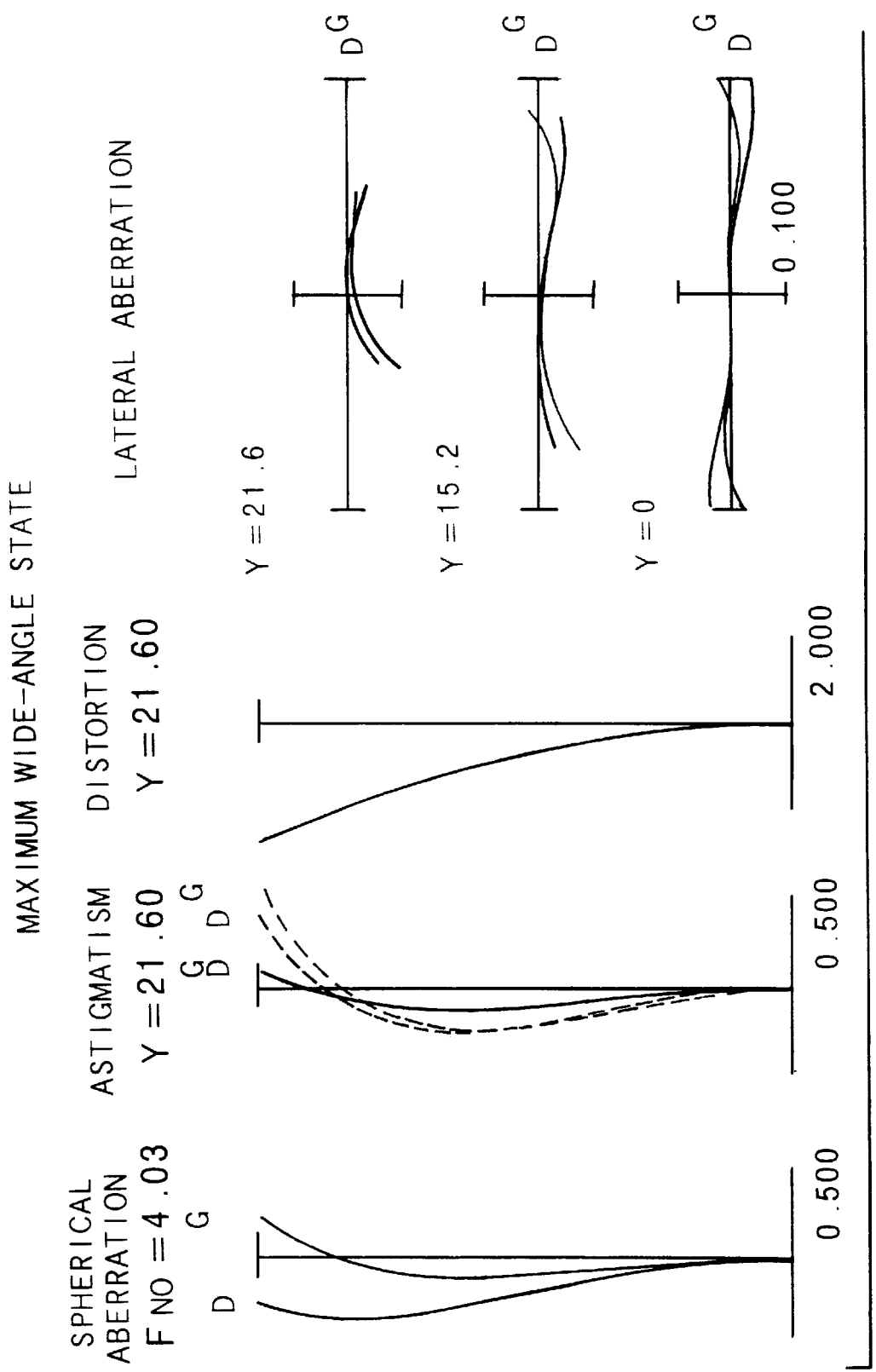
FIG. 2 shows various aberration diagrams at the maximum wide-angle state of the first embodiment.
Figure 3:
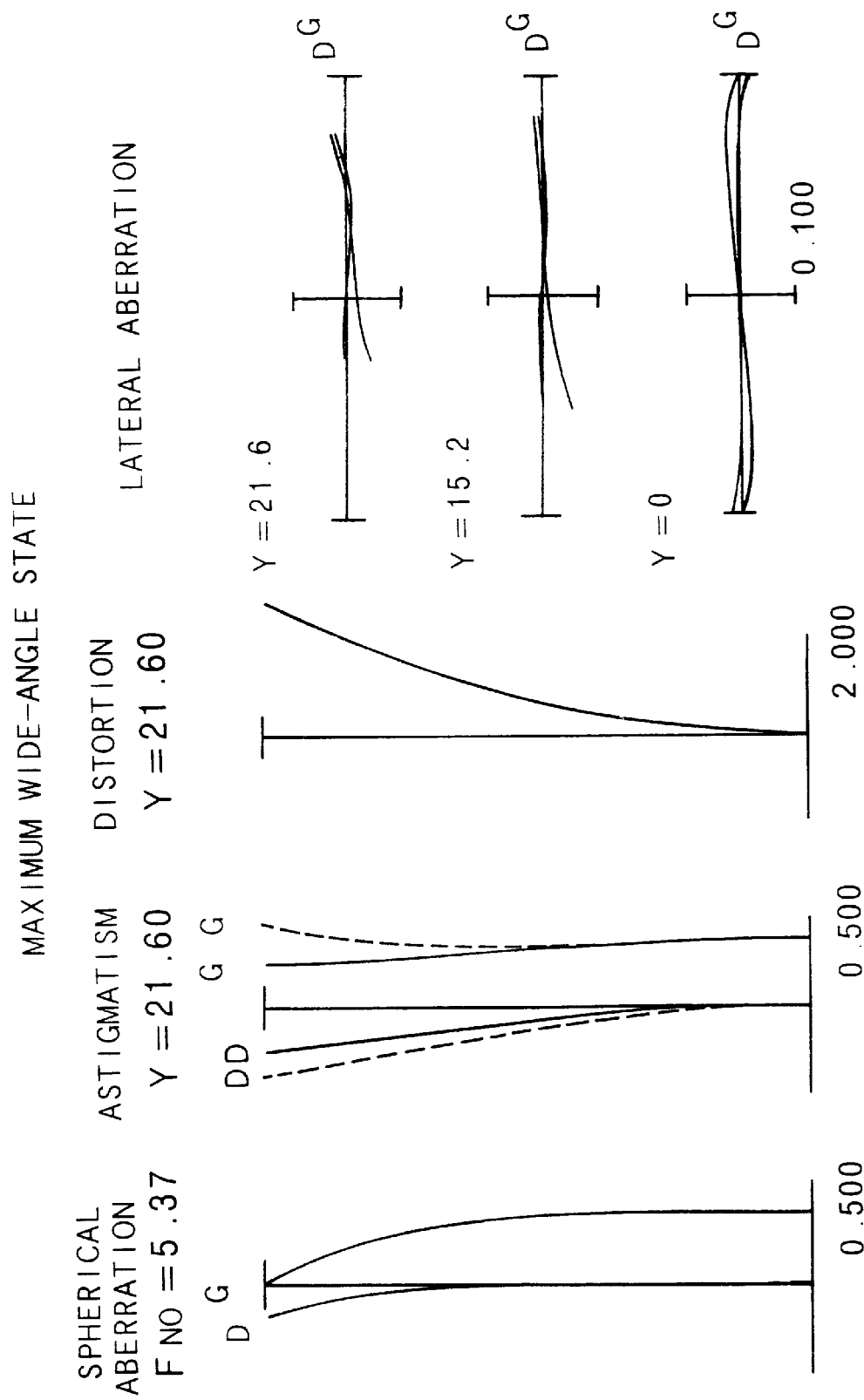
FIG. 3 shows various aberration diagrams at the maximum telephoto state of the first embodiment.
Figure 4:
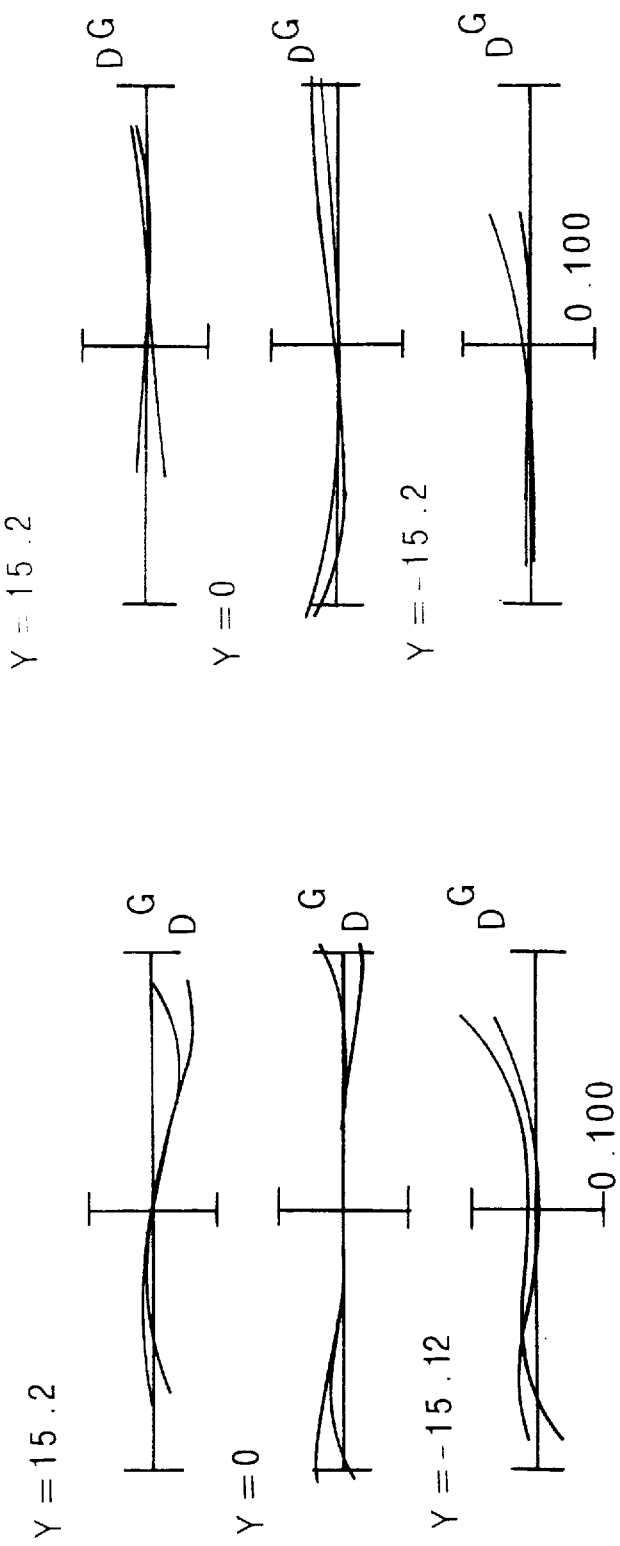
FIG. 4 is a lateral aberration diagram measured in the first embodiment during vibration reduction using the shift method.
Figure 5:
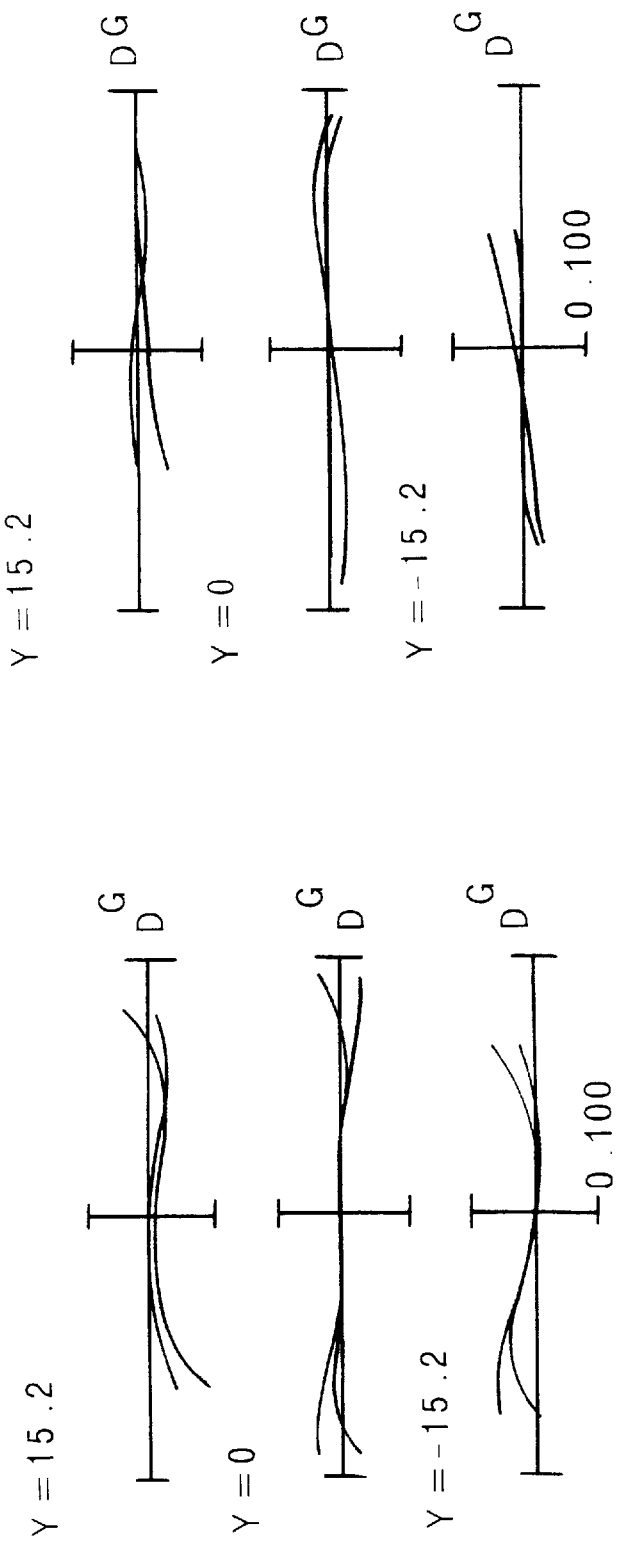
FIG. 5 is a lateral aberration diagram measured in the first embodiment during vibration reduction using the tilt method.

FIGS. 2 and 3 show the measured spherical aberration, astigmatism, distortion, and lateral aberration, respectively, at the wide-angle and maximum telephoto states in the first embodiment. FIGS. 4 and 5 show various aberrations generated, respectively, in the shift-type and tilt-type vibration reduction. In the same manner, FIGS. 7 through 10, respectively, show various aberrations in the second embodiment; FIGS. 12 through 15, respectively, show various aberrations generated in the third embodiment. In each of the figures showing aberrations, $F_{NO}$ shows the F number; Y shows the image height; D shows the d-line; and G shows the g-line. Also in the figures showing astigmatism, the solid line shows the sagittal image plane while the dotted lines show the meridional image plane.

It is apparent from each of the figures showing aberrations that each of the first three embodiments achieve excellent correction as to aberrations and provides excellent vibration compensation.

Note that when the zoom lens system allows a sufficient magnification and vibration aberration can be sufficiently corrected, the second lens group $G_2$ can be fixed during zooming.

As described above, each of the three embodiments provides a compact high-performance zoom lens system with a vibration-reduction function.

In further embodiments of the present invention, satisfactory results have been obtained by providing a zoom lens system with a vibration-reduction function, comprising, in order from the object side:

a first lens group $G_1$ having a positive refractive power;

a second lens group $G_2$ having a negative refractive power;

a third lens group $G_3$ having a negative refractive power;

a fourth lens group $G_4$ having a positive refractive power; and a fifth lens group $G_5$ having a negative refractive power;

wherein when zooming, each of the respective distances between the first and second lens groups, the second and third lens groups, the third and fourth lens groups, and the fourth and fifth lens groups changes. The fourth lens group has a shift lens unit $G_{4P}$ arranged such that it is moveable across to the optical axis, has a positive refractive power, and satisfies the following formula (11):

$$1.0 < f_{4P}/f_4 < 2.5 \qquad (11)$$

where $f_{4P}$ is a focal length for the lens unit $G_{4P}$ with a vibration-reduction function in the fourth lens group $G_4$, and $f_4$ is a focal length for the fourth lens group $G_4$.

The lens unit $G_{4P}$ with a vibration-reduction function is formed to satisfy the aforementioned formula (11). Formula (11) rules an appropriate refraction force distribution between the lens unit $G_{4P}$ with a vibration-reduction function and the fourth lens group $G_4$. When the value exceeds the upper limit of formula (11), the amount of eccentricity of the lens unit $G_{4P}$ to the optical axis, during vibration-reduction, increasing the size of the holding and drive mechanism and power consumption. Alternatively, when the value is below the lower limit, the Petzval sum for the lens unit $G_{4P}$ increases, significantly deteriorating performance during vibration-reduction.

The zoom lens system of the fourth through eighth embodiments of the present invention employs a multigroup move zoom-type (zoom lens which has a many movable lens group for zooming) construction in which all respective distances between the five lens groups change during zooming. To reduce the entire length, each of the lens groups are arranged in the so-called "telephoto-type," the two (positive / negative) groups on the image side; on the object side are arranged three (positive / negative / negative) groups. As a whole, the system has five, in order from the object side, positive / negative / negative / positive / negative groups. This helps keep the system small, particularly at the maximum wide-angle state. The fact that a number of lens groups, which are responsible for zooming, moves makes it relatively easy to increase magnification. Moreover, the fact that there are a number of movable groups provides an advantage in correcting aberration, exhibiting an excellent imaging performance throughout the zoom zone.

Figure 16:
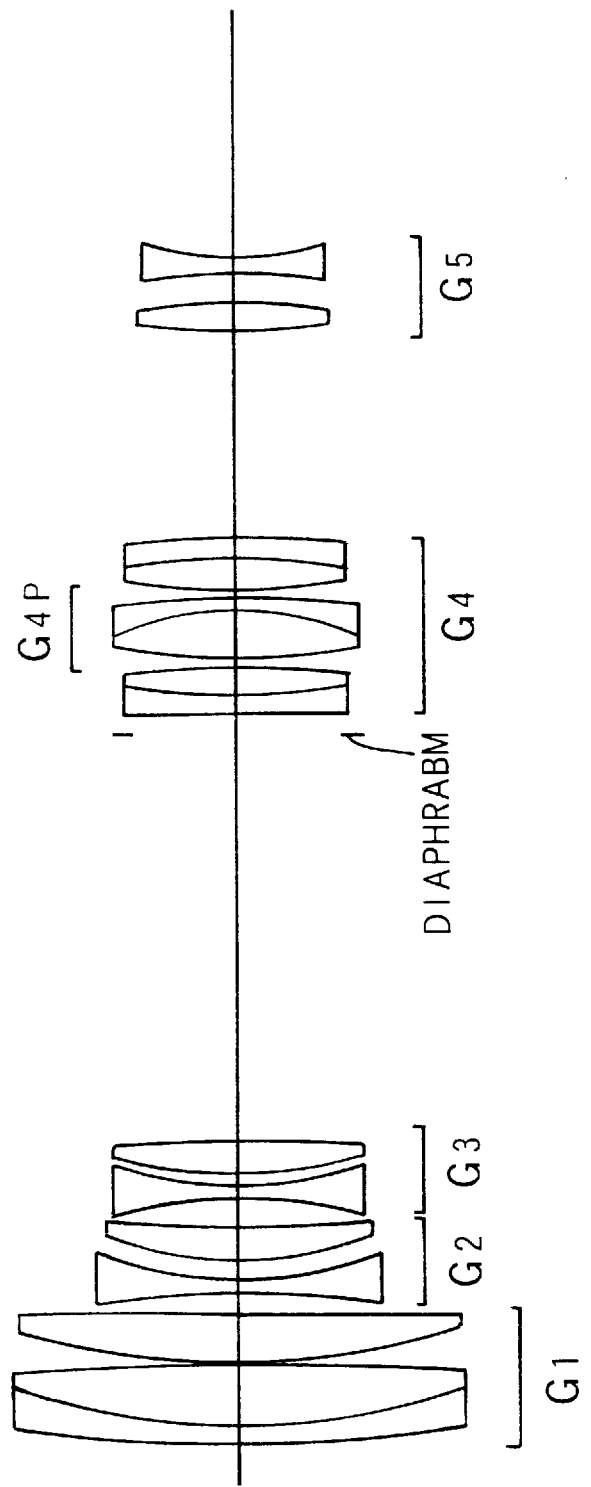
FIG. 16 is a block diagram illustrating a layout of the lenses in a fourth embodiment of the present invention.

In the fourth embodiment, shown in FIG. 16, among the five lens groups from the first lens group $G_1$ through the fifth lens group $G_5$, the refractive power of the fourth lens group $G_4$ particularly tends to increase. It is preferable, therefore, that the fourth lens group $G_4$ is constructed with at least three lens components and an arbitral lens component among them is allocated to serve as the lens unit $G_{4P}$ with a vibration-reduction function. This minimizes the occurrence of the spherical aberration and the coma aberration.

As noted above, two methods are used for vibration-reduction: the method in which the lens unit $G_{4P}$ is shifted in a direction almost perpendicular to the optical axis (shift method for vibration reduction), and the method in which the lens unit $G_{4P}$ is rotated around a point on the optical axis (tilted method).

For the fourth through eighth embodiments, it is preferable that each of the conditions of the following formulae (12) to (15) are satisfied:

$$2.0 < F_T f_1 / f_T < 3.6 \tag{12}$$

$$1.0 < f_2 / f_3 < 2.0 \tag{13}$$

$$0.6 < |f_{W23}| / f_W < 1.2 \tag{14}$$

$$0.6 < f_4 / |f_5| < 1.2 \tag{15}$$

where $f_W$ is the focal length of the entire zoom lens system at the maximum wide-angle state;

$f_T$ is the focal length of the entire zoom lens system at the maximum telephoto state;

$f_1$ is the focal length of the first lens group $G_1$;

$f_2$ is the focal length of the second lens group $G_2$;

$f_3$ is the focal length of the third lens group $G_3$;

$f_4$ is the focal length of the fourth lens group $G_4$;

$f_5$ is the focal length of the fifth lens group $G_5$;

$f_{W2-3}$ is the focal length between the second lens group $G_2$ and the third lens group $G_3$ at the maximum wide-angle state; and $F_T$ is the F=number at the maximum telephoto state.

Formula (12) provides an appropriate nominal F-number for the first lens group $G_1$ at the maximum wide-angle state. When the value exceeds the upper limit of formula (12), the focal length of the first lens group $G_1$ becomes longer than it should, increasing the amount of movement of the first lens group during focusing, consequently making miniaturization and weight reduction very difficult, if not impossible. Values below the lower limit make the focal length of the first lens group $G_1$. shorter than it should, it is difficult to correct fluctuation of aberrations due to focusing, and the imaging performance degrades.

Formula (13) provides an appropriate ratio of the focal length of the second lens group $G_2$ to the focal length of the third lens group $G_3$. Any values exceeding either the upper limit or lower limit cause unfavorable results in that the coma aberration varies to a large degree during zooming and that the spherical aberration is excessively corrected at the maximum wide-angle state.

Formula (14) provides an appropriate ratio of the focal length between the second lens group $G_2$ and the third lens group $G_3$ at the maximum wide-angle state to the focal length of the entire lens system at the maximum wide-angle state. The values exceeding the upper limit of formula (14) make it difficult to obtain sufficient back-focus at the maximum wide-angle state. Alternatively, the values below the lower limit increase the lens diameters of the fourth lens group $G_4$ and the fifth lens group $G_5$, making miniaturization difficult.

Formula (15) provides an appropriate ratio of the focal length of the fourth lens group $G_4$ to the focal length of the fifth lens group $G_5$. The values exceeding the upper limit of formula (15) shorten the focal length of the fifth lens group $G_5$ too much, giving a large negative Petzval sum value, as a result, failing to provide an excellent imaging performance. Alternatively, the values below the lower limit shorten the focal length of the fourth lens $G_4$ too much, increasing the spherical aberration throughout the entire zoom zone and coma aberration, lowering imaging performance.

FIGS. 16, 21, 26, 31, and 36 are lens block diagrams of the fourth through eighth embodiments for the zoom lens system with a vibration-reduction function. Each of the embodiments are zoom lens systems comprising a first lens group $G_1$ having a positive refractive power, a second lens group $G_2$ having a negative refractive power, a third lens group $G_3$ having a negative refractive power, a fourth lens group $G_4$ having a positive refractive power, and a fifth lens group $G_5$ having a negative refractive power and zooming is performed by changing all the distances between each of the adjacent lens groups.

The lens unit $G_{4P}$ having a vibration-reduction function, the lens component in the fourth lens group $G_4$, has a positive refractive power and is arranged such that it can be eccentric to the optical axis. In each of the embodiments, the image blur due to vibration is corrected by moving the lens unit $G_{4P}$ in a direction almost perpendicular to the optical axis or by rotating around a point on the optical axis.

Values for the fourth through eighth embodiments are shown in Tables 5 through 9 herein. The "Values of the Items" table for each embodiment shows each of the focal lengths of the entire system; $F_{NO}$ is the F-number and $2\omega$ is the field angle. In "Values of Lenses" tables, numbers in the number column show the numbers given to each of the lens surfaces starting from the object side; r in the second column shows the radius of the curvature of each of the lens surfaces; d in the third column is the lens surface separation; $v_d$ is the Abbe number based on the d-line ($\lambda$=587.6 nm) of each of the lenses; $n_d$ in the fifth column is the refractive index of each of the lenses to the d-line; the sixth column shows the numbers of the lens group to which each of the lens belong. In the "Variable Separation in Zooming" table, $d_0$ shows the distance between an object point and most object-side lens surface of the zoom lens.

TABLE 5

(Fourth Embodiment)

Values of the Items in the Fourth Embodiment f = 71.40 to 292.00, $F_{No}$ = 4.31 to 5.61, 2ω = 33.66 to 8.46°

Data of lenses (Fourth Embodiment)

| Number | r | d | $v_d$ | $n_d$ | |
|---|---|---|---|---|---|
| 1 | 217.6503 | 2.2000 | 33.89 | 1.803840 | $G_1$ |
| 2 | 89.1633 | 6.8000 | 82.52 | 1.497820 | $G_1$ |
| 3 | −498.8014 | 0.4000 | | | |
| 4 | 89.4670 | 5.8000 | 64.10 | 1.516800 | $G_1$ |
| 5 | −3736.0158 | ($d_5$) | | | |
| 6 | −158.2214 | 1.7000 | 45.37 | 1.796681 | $G_2$ |
| 7 | 45.6099 | 2.0000 | | | |
| 8 | 35.4537 | 4.6000 | 33.75 | 1.648311 | $G_2$ |
| 9 | 238.8331 | ($d_9$) | | | |
| 10 | −65.2722 | 1.5000 | 40.90 | 1.796310 | $G_3$ |
| 11 | 47.0116 | 1.6000 | | | |
| 12 | 58.7953 | 4.3000 | 27.83 | 1.699110 | $G_3$ |
| 13 | −115.2664 | ($d_{13}$) | | | |
| 14 | 9317.0204 | 2.0000 | 40.90 | 1.796310 | $G_4$ |
| 15 | 85.9814 | 3.6000 | 58.90 | 1.518230 | $G_4$ |
| 16 | −86.4694 | 0.8000 | | | |
| 17 | 80.0000 | 6.0000 | 60.03 | 1.640000 | $G_{4B}$ |
| 18 | −35.3500 | 1.5000 | 33.89 | 1.803840 | $G_{4B}$ |
| 19 | −106.9423 | 0.8000 | | | |

TABLE 5-continued (Fourth Embodiment)

| | | | | | |
|---|---|---|---|---|---|
| 20 | 77.4474 | 4.1000 | 70.41 | 1.487490 | $G_4$ |
| 21 | -56.9160 | 2.0000 | 38.03 | 1.603420 | $G_4$ |
| 22 | -144.4759 | $(d_{22})$ | | | |
| 23 | 191.6480 | 3.0000 | 27.83 | 1.699110 | $G_5$ |
| 24 | -73.6202 | 3.8000 | | | |
| 25 | -65.3122 | 1.5000 | 49.45 | 1.772789 | $G_5$ |
| 26 | 33.4495 | $(d_{26})$ | | | |

Variable Separation in Zooming
(Fourth Embodiment)

| | | | |
|---|---|---|---|
| f | 71.40000 | 150.00000 | 292.00000 |
| $d_0$ | ∞ | ∞ | ∞ |
| $d_5$ | 2.17556 | 29.01922 | 66.69506 |
| $d_9$ | 3.39403 | 13.26123 | 8.12835 |
| $d_{13}$ | 51.08990 | 20.17832 | 4.63923 |
| $d_{22}$ | 24.98578 | 19.18650 | 2.18263 |
| $d_{26}$ | 42.27512 | 65.86963 | 93.39435 |

Vibration-Reduction Data
(Fourth Embodiment)

| | | Maximum wide-angle state | Maximum telephoto state |
|---|---|---|---|
| Shift Method | Shift amount of the lens unit $G_{4P}$ with vibration-reduction function (mm) | 0.661 | 0.661 |
| | The movement amount of the image | 0.790 | 1.000 |
| Tilt Method | Tilt amount of the lens unit $G_{4P}$ with vibration-reduction function (rad) | 0.00331 | 0.00331 |
| | The movement amount of the image | 0.804 | 1.025 |

Rotation Center: 200 mm toward the direction of an object from the surface on the side of the lens unit $G_{4P}$ with a vibration-reduction function on an optical axis.

TABLE 6

(Fifth Embodiment)

Values of the Items in the Fifth Embodiment f = 71.40 to 292.00, $F_{No}$ = 4.18 to 5.61, 2ω = 33.66 to 8.46°

Data of lenses (Fifth Embodiment)

| Number | r | d | $v_d$ | $n_d$ | |
|---|---|---|---|---|---|
| 1 | 214.0290 | 2.2000 | 33.27 | 1.806100 | $G_1$ |
| 2 | 90.2555 | 6.8000 | 82.52 | 1.497820 | $G_1$ |
| 3 | -498.1887 | 0.4000 | | | |
| 4 | 89.3973 | 5.8000 | 64.10 | 1.516800 | $G_1$ |
| 5 | -11932.36800 | $(d_5)$ | | | |
| 6 | -145.6476 | 1.7000 | 45.37 | 1.796681 | $G_2$ |
| 7 | 43.5093 | 2.0000 | | | |
| 8 | 34.8640 | 4.6000 | 33.75 | 1.648311 | $G_2$ |
| 9 | 351.0881 | $(d_9)$ | | | |
| 10 | -64.4069 | 1.5000 | 40.90 | 1.796310 | $G_3$ |
| 11 | 49.7607 | 1.6000 | | | |
| 12 | 64.4924 | 4.3000 | 27.83 | 1.699110 | $G_3$ |
| 13 | -109.7160 | $(d_{13})$ | | | |
| 14 | -225.3807 | 2.0000 | 40.90 | 1.796310 | $G_4$ |
| 15 | 123.3469 | 3.6000 | 58.90 | 1.518230 | $G_4$ |
| 16 | -63.6497 | 0.8000 | | | |
| 17 | 69.2577 | 6.5000 | 60.03 | 1.640000 | $G_{4B}$ |
| 18 | -33.7390 | 1.3000 | 33.89 | 1.803840 | $G_{4B}$ |
| 19 | -98.7166 | 0.8000 | | | |
| 20 | 85.6308 | 4.0000 | 70.41 | 1.487490 | $G_4$ |
| 21 | -74.7968 | 2.0000 | 38.03 | 1.603420 | $G_4$ |

TABLE 6-continued (Fifth Embodiment)

| | | | | | |
|---|---|---|---|---|---|
| 22 | -235.8495 | $(d_{22})$ | | | |
| 23 | 202.1553 | 3.0000 | 27.83 | 1.699110 | $G_5$ |
| 24 | -73.3733 | 3.8000 | | | |
| 25 | -65.4273 | 1.5000 | 49.45 | 1.772789 | $G_5$ |
| 26 | 34.5540 | $(d_{26})$ | | | |

Variable Separation in Zooming
(Fifth Embodiment)

| | | | |
|---|---|---|---|
| f | 71.40000 | 150.00000 | 292.00000 |
| $d_0$ | ∞ | ∞ | ∞ |
| $d_5$ | 2.86170 | 29.88992 | 67.94453 |
| $d_9$ | 2.48092 | 12.38252 | 6.88488 |
| $d_{13}$ | 51.18721 | 20.27195 | 5.42781 |
| $d_{22}$ | 25.43404 | 19.41949 | 1.70665 |
| $d_{26}$ | 42.30030 | 66.00760 | 94.11647 |

Vibration-Reduction Data
(Fifth Embodiment)

| | | Maximum wide-angle state | Maximum telephoto state |
|---|---|---|---|
| Shift Method | Shift amount of the lens unit $G_{4P}$ with vibration-reduction function (mm) | 0.573 | 0.573 |
| | The movement amount of the image | 0.795 | 1.000 |
| Tilt Method | Tilt amount of the lens unit $G_{4P}$ with vibration-reduction function (rad) | 0.00382 | 0.00382 |
| | The movement amount of the image | 0.816 | 1.032 |

Rotation Center: 150 mm toward the direction of an object from the surface on the side of the lens unit $G_{4P}$ with a vibration-reduction function on an optical axis.

TABLE 7

(Sixth Embodiment)

Values of the Items in the Sixth Embodiment f = 71.40 to 292.00, $F_{NO}$ = 4.20 to 5.61, 2ω = 33.66° to 8.46°

Data of lenses (Sixth Embodiment)

| Number | r | d | $v_d$ | $n_d$ | |
|---|---|---|---|---|---|
| 1 | 217.7078 | 2.2000 | 33.27 | 1.806100 | $G_1$ |
| 2 | 90.9050 | 6.8000 | 82.52 | 1.497820 | $G_1$ |
| 3 | -474.4389 | 0.4000 | | | |
| 4 | 89.7631 | 5.8000 | 64.10 | 1.516800 | $G_1$ |
| 5 | -9349.9556 | $(d_5)$ | | | |
| 6 | -155.3731 | 1.7000 | 45.37 | 1.796681 | $G_2$ |
| 7 | 45.1775 | 2.0000 | | | |
| 8 | 35.3655 | 4.6000 | 33.75 | 1.648311 | $G_2$ |
| 9 | 257.2371 | $(d_9)$ | | | |
| 10 | -64.8092 | 1.5000 | 40.90 | 1.796310 | $G_3$ |
| 11 | 48.3160 | 1.6000 | | | |
| 12 | 61.1563 | 4.3000 | 27.83 | 1.699110 | $G_3$ |
| 13 | -113.2450 | $(d_{13})$ | | | |
| 14 | -312.7995 | 2.0000 | 40.90 | 1.796310 | $G_4$ |
| 15 | 217.5946 | 3.6000 | 64.10 | 1.516800 | $G_4$ |
| 16 | -72.0826 | 0.8000 | | | |
| 17 | 74.3000 | 6.0000 | 60.03 | 1.640000 | $G_{4B}$ |
| 18 | -34.8329 | 1.3000 | 33.89 | 1.803840 | $G_{4B}$ |
| 19 | -106.5600 | 0.8000 | | | |
| 20 | 94.8233 | 4.1000 | 60.03 | 1.640000 | $G_4$ |
| 21 | -78.2658 | 2.0000 | 33.89 | 1.803840 | $G_4$ |
| 22 | -329.8677 | $(d_{22})$ | | | |

TABLE 7-continued (Sixth Embodiment)

| | | | | | |
|---|---|---|---|---|---|
| 23 | 199.3341 | 3.0000 | 27.83 | 1.699110 | $G_5$ |
| 24 | -71.7671 | 3.8000 | | | |
| 25 | -63.1707 | 1.5000 | 49.45 | 1.772789 | $G_5$ |
| 26 | 33.8745 | $(d_{26})$ | | | |

Variable Separation in Zooming
(Sixth Embodiment)

| F | 71.40000 | 150.00000 | 292.00000 |
|---|---|---|---|
| $d_0$ | ∞ | ∞ | ∞ |
| $d_5$ | 2.26707 | 29.11073 | 66.78655 |
| $d_9$ | 3.18533 | 13.05253 | 7.91966 |
| $d_{13}$ | 51.70377 | 20.79218 | 5.25307 |
| $d_{22}$ | 25.02380 | 19.22452 | 2.22069 |
| $d_{26}$ | 42.27122 | 65.86573 | 93.39030 |

Vibration-Reduction Data
(Sixth Embodiment)

| | | Maximum wide-angle state | Maximum telephoto state |
|---|---|---|---|
| Shift Method | Shift amount of the lens unit $G_{4P}$ with vibration-reduction function (mm) | 0.625 | 0.625 |
| | The movement amount of the image | 0.791 | 1.000 |
| Tilt Method | Tilt amount of the lens unit $G_{4P}$ with vibration-reduction function (rad) | 0.00208 | 0.00208 |
| | The movement amount of the image | 0.800 | 1.016 |

Rotation Center: 300 mm toward the direction of an object from the surface on the side of the lens unit $G_{4P}$ with a vibration-reduction function on an optical axis.

TABLE 8

(Seventh Embodiment)

Values of the Items in the Seventh Embodiment f = 72.00 to 292.00, $F_{NO}$ = 4.20 to 5.64, 2ω = 33.40° to 8.46°

Data of lenses
(Seventh Embodiment)

| Number | r | d | $\nu_d$ | $n_d$ | |
|---|---|---|---|---|---|
| 1 | 215.4811 | 2.2000 | 33.27 | 1.806100 | $G_1$ |
| 2 | 91.9226 | 6.8000 | 82.52 | 1.497820 | $G_1$ |
| 3 | -474.6497 | 0.4000 | | | |
| 4 | 91.3271 | 5.8000 | 64.10 | 1.516800 | $G_1$ |
| 5 | -6333.1535 | $(d_5)$ | | | |
| 6 | -189.4134 | 1.7000 | 45.37 | 1.796681 | $G_2$ |
| 7 | 50.6942 | 2.0000 | | | |
| 8 | 37.0210 | 4.6000 | 33.75 | 1.648311 | $G_2$ |
| 9 | 149.1064 | $(d_9)$ | | | |
| 10 | -60.0215 | 1.5000 | 40.90 | 1.796310 | $G_3$ |
| 11 | 48.1105 | 1.6000 | | | |
| 12 | 58.3502 | 4.3000 | 27.83 | 1.699110 | $G_3$ |
| 13 | -102.1363 | $(d_{13})$ | | | |
| 14 | -617.4713 | 2.0000 | 40.90 | 1.796310 | $G_4$ |
| 15 | 81.9385 | 3.6000 | 58.90 | 1.518230 | $G_4$ |
| 16 | -79.4737 | 0.8000 | | | |
| 17 | 73.5897 | 6.0000 | 60.03 | 1.640000 | $G_{4B}$ |
| 18 | -33.8537 | 1.3000 | 33.89 | 1.803840 | $G_{4B}$ |
| 19 | -101.9100 | 0.8000 | | | |
| 20 | 67.3041 | 4.1000 | 70.41 | 1.487490 | $G_4$ |
| 21 | -74.1129 | 2.0000 | 38.03 | 1.603420 | $G_4$ |
| 22 | -187.3444 | $(d_{22})$ | | | |
| 23 | 225.6792 | 3.0000 | 27.83 | 1.699110 | $G_5$ |

TABLE 8-continued (Seventh Embodiment)

| | | | | | |
|---|---|---|---|---|---|
| 24 | -66.9730 | 3.8000 | | | |
| 25 | -57.7477 | 1.5000 | 49.45 | 1.772789 | $G_5$ |
| 26 | 32.7659 | $(d_{26})$ | | | |

Variable Separation in Zooming
(Seventh Embodiment)

| f | 72.00000 | 150.00000 | 292.00000 |
|---|---|---|---|
| $d_0$ | ∞ | ∞ | ∞ |
| $d_5$ | 0.72072 | 27.24305 | 63.99765 |
| $d_9$ | 5.83864 | 15.54781 | 10.98458 |
| $d_{13}$ | 50.99489 | 20.31159 | 3.37677 |
| $d_{22}$ | 23.65967 | 18.11147 | 2.85492 |
| $d_{26}$ | 42.35174 | 65.60872 | 91.96291 |

Vibration-Reduction Data
(Seventh Embodiment)

| | | Maximum wide-angle state | Maximum telephoto state |
|---|---|---|---|
| Shift Method | Shift amount of the lens unit $G_{4P}$ with vibration-reduction function (mm) | 0.603 | 0.603 |
| | The movement amount of the image | 0.779 | 1.000 |
| Tilt Method | Tilt amount of the lens unit $G_{4P}$ with vibration-reduction function (rad) | 0.00302 | 0.00302 |
| | The movement amount of the image | 0.793 | 1.022 |

Rotation Center: 200 mm toward the direction of an object from the surface on the side of the lens unit $G_{4P}$ with a vibration-reduction function on an optical axis.

TABLE 9

(Eighth Embodiment)

Values of the Items in the Eighth Embodiment f = 71.35 to 292.00, $F_{NO}$ = 4.18 to 5.61, 2ω = 33.68° to 8.46°

Value of Lenses
(Seventh Embodiment)

| Number | r | d | $\nu_d$ | $n_d$ | |
|---|---|---|---|---|---|
| 1 | 237.9442 | 2.2000 | 33.75 | 1.648311 | $G_1$ |
| 2 | 81.6842 | 7.0000 | 82.52 | 1.497820 | $G_1$ |
| 3 | -575.1013 | 0.4000 | | | |
| 4 | 94.1119 | 5.3000 | 64.10 | 1.516800 | $G_1$ |
| 5 | 10132.4596 | $(d_5)$ | | | |
| 6 | -150.3205 | 1.7000 | 45.37 | 1.796681 | $G_2$ |
| 7 | 44.9891 | 2.0000 | | | |
| 8 | 35.2221 | 4.6000 | 33.75 | 1.648311 | $G_2$ |
| 9 | 274.0872 | $(d_9)$ | | | |
| 10 | -67.7019 | 1.5000 | 40.90 | 1.796310 | $G_3$ |
| 11 | 47.4777 | 1.6000 | | | |
| 12 | 60.5925 | 4.3000 | 27.83 | 1.699110 | $G_3$ |
| 13 | -119.0804 | $(d_{13})$ | | | |
| 14 | 3947.4620 | 2.0000 | 40.90 | 1.796310 | $G_4$ |
| 15 | 99.9113 | 3.6000 | 60.23 | 1.518350 | $G_4$ |
| 16 | -85.2173 | 0.8000 | | | |
| 17 | 69.4771 | 6.3000 | 60.03 | 1.640000 | $G_{4B}$ |
| 18 | -34.2443 | 1.3000 | 33.89 | 1.803840 | $G_{4B}$ |
| 19 | -103.0796 | 0.8000 | | | |
| 20 | 99.5847 | 4.1000 | 70.41 | 1.487490 | $G_4$ |
| 21 | -57.1575 | 2.0000 | 38.03 | 1.603420 | $G_4$ |
| 22 | -168.8056 | $(d_{22})$ | | | |
| 23 | 207.1823 | 3.0000 | 27.83 | 1.699110 | $G_5$ |
| 24 | -70.3425 | 3.8000 | | | |

TABLE 9-continued (Eighth Embodiment)

| 25 | −61.8019 | 1.5000 | 49.45 | 1.772789 | $G_5$ |
|---|---|---|---|---|---|
| 26 | 34.1859 | ($d_{26}$) | | | |

Variable Separation in Zooming
(Eighth Embodiment)

| f | 71.35482 | 150.00000 | 292.00000 |
|---|---|---|---|
| $d_0$ | ∞ | ∞ | ∞ |
| $d_5$ | 2.43382 | 29.30493 | 66.98711 |
| $d_9$ | 2.86307 | 12.73541 | 7.57770 |
| $d_{13}$ | 51.91294 | 20.98517 | 5.48083 |
| $d_{22}$ | 24.28169 | 18.46600 | 1.44589 |
| $d_{26}$ | 42.22227 | 65.83371 | 93.38334 |

Vibration-Reduction Data
(Eighth Embodiment)

| | | Maximum wide-angle state | Maximum telephoto state |
|---|---|---|---|
| Shift Method | Shift amount of the lens unit $G_{4P}$ with vibration-reduction function (mm) | 0.590 | 0.590 |
| | The movement amount of the image | 0.791 | 0.999 |
| Tilt Method | Tilt amount of the lens unit $G_{4P}$ with vibration-reduction function (rad) | 0.00393 | 0.00393 |
| | The movement amount of the image | 0.811 | 1.032 |

Rotation Center: 150 mm toward the direction of an object from the surface on the side of the lens unit $G_{4P}$ with a vibration-reduction function on an optical axis.

TABLE 10

| | Embodiment Number | | | | |
|---|---|---|---|---|---|
| | 4 | 5 | 6 | 7 | 8 |
| $f_1$ | 140.000 | 140.000 | 140.000 | 140.000 | 139.992 |
| $f_2$ | −159.690 | −159.690 | −159.690 | −159.690 | −159.762 |
| $f_3$ | −99.273 | −99.201 | −99.273 | −102.419 | −99.261 |
| $f_4$ | 46.590 | 47.000 | 46.590 | 45.500 | 46.585 |
| $f_5$ | −50.370 | −51.742 | −50.370 | −46.783 | −50.376 |
| $f_{4P}$ | 92.803 | 80.772 | 88.167 | 86.020 | 82.693 |
| $f_W$ | 71.400 | 71.400 | 71.400 | 72.000 | 71.355 |
| $f_T$ | 292.000 | 292.000 | 292.000 | 292.000 | 292.000 |
| $f_{W23}$ | −59.293 | −59.266 | −59.293 | −60.428 | −59.299 |
| $F_T$ | 5.609 | 5.607 | 5.610 | 5.640 | 5.612 |
| (1) $f_{4P}/f_4$ | 1.992 | 1.719 | 1.892 | 1.891 | 1.775 |
| (2) $F_T \cdot f_1/f_T$ | 2.689 | 2.688 | 2.690 | 2.704 | 2.691 |
| (3) $f_2/f_3$ | 1.609 | 1.610 | 1.609 | 1.559 | 1.610 |
| (4) $|f_{W23}|/f_W$ | 0.830 | 0.830 | 0.830 | 0.839 | 0.831 |
| (5) $f_4/|f_5|$ | 0.925 | 0.908 | 0.925 | 0.973 | 0.925 |

Figure 17:
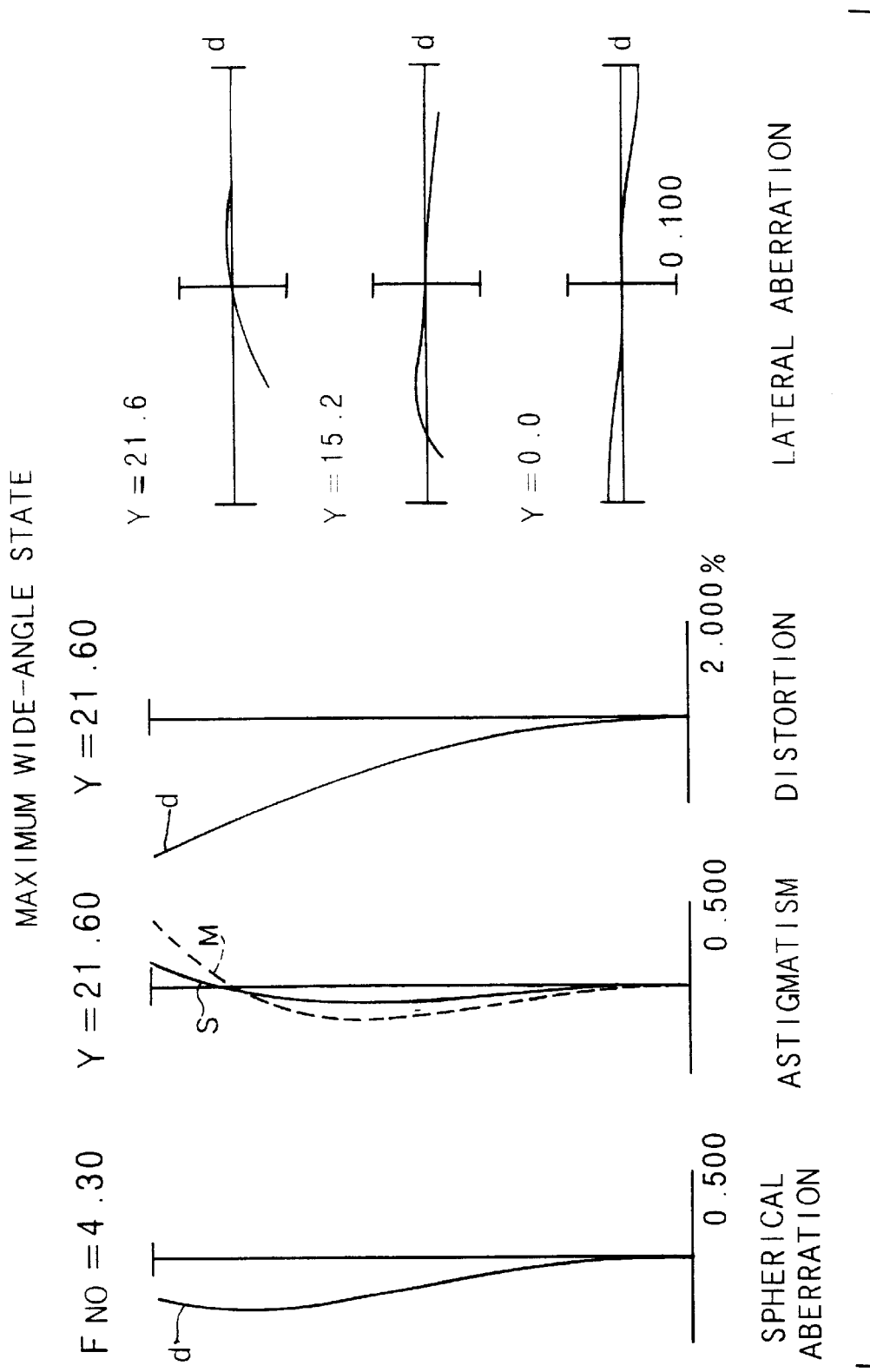
FIG. 17 shows various aberration diagrams at the maximum wide-angle state of the fourth embodiment.
Figure 18:
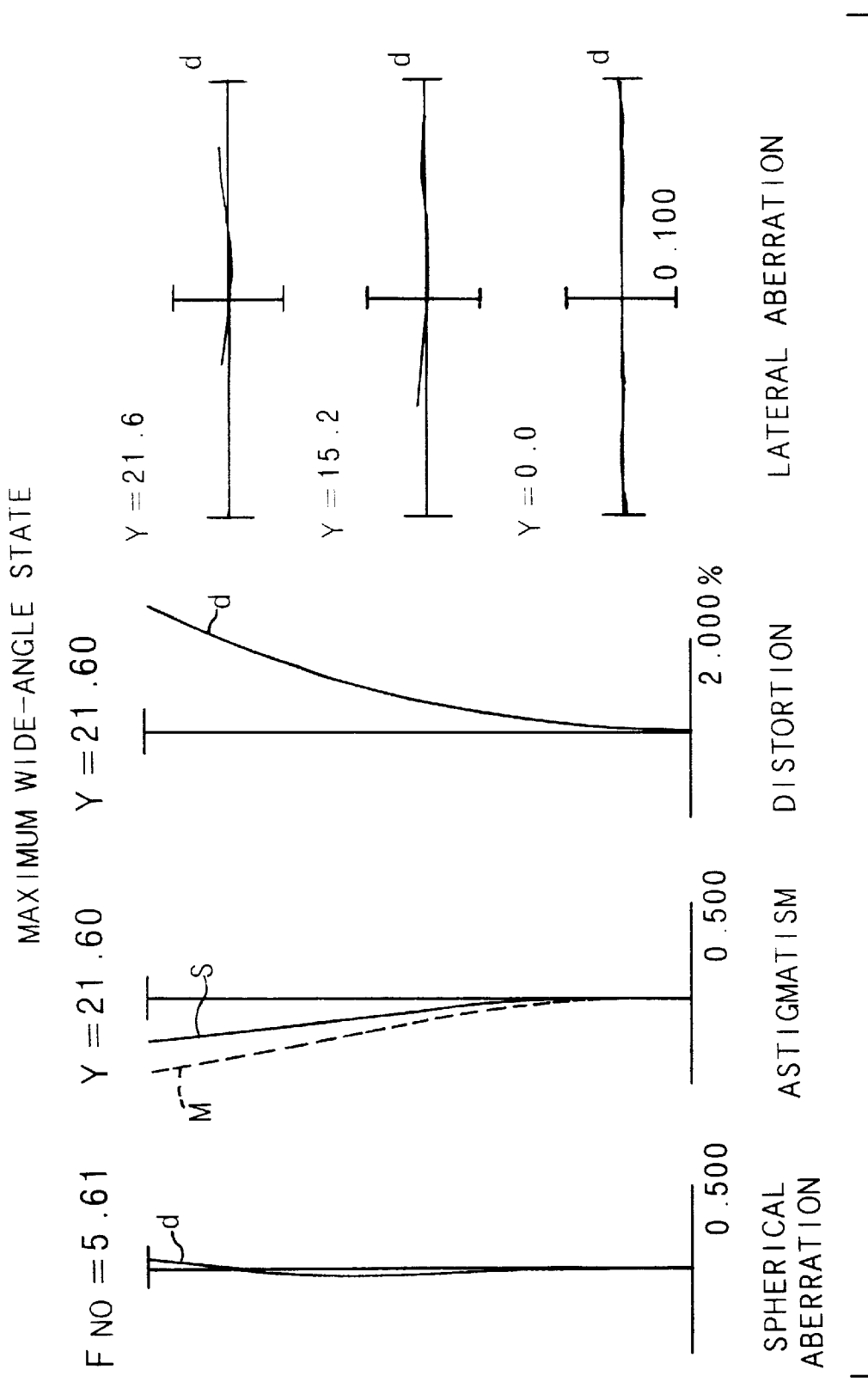
FIG. 18 shows various aberration diagrams at the maximum telephoto state of the fourth embodiment.
Figure 21:
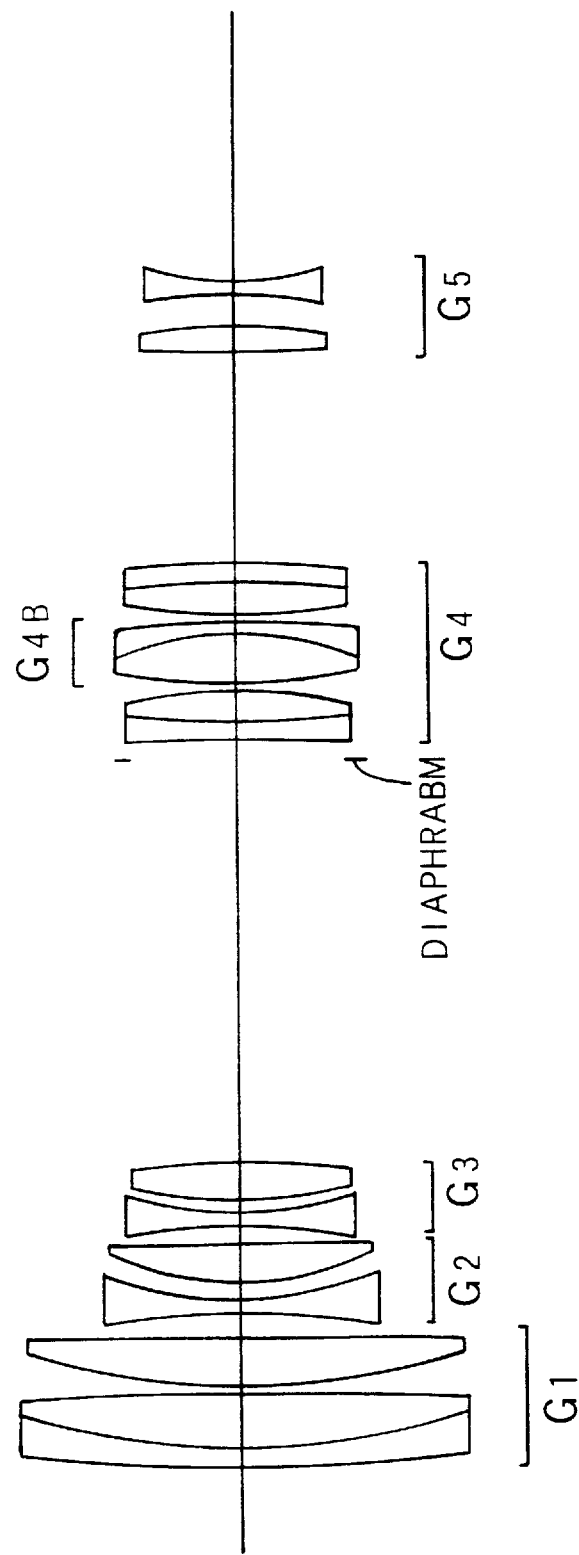
FIG. 21 is a block diagram illustrating a layout of the lenses in a fifth embodiment of the present invention.
Figure 22:
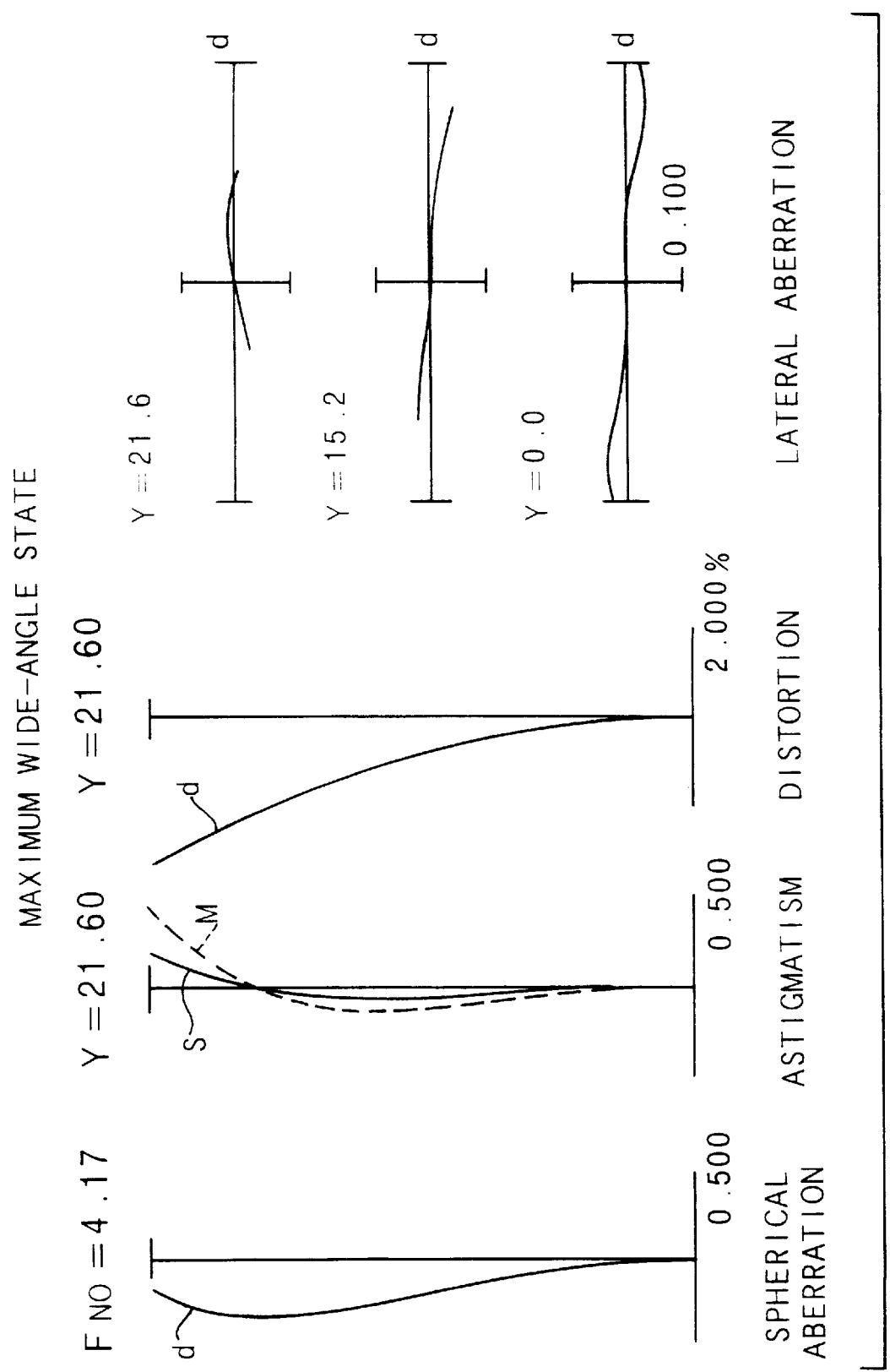
FIG. 22 shows various aberration diagrams at the maximum wide-angle state of the fifth embodiment.
Figure 23:
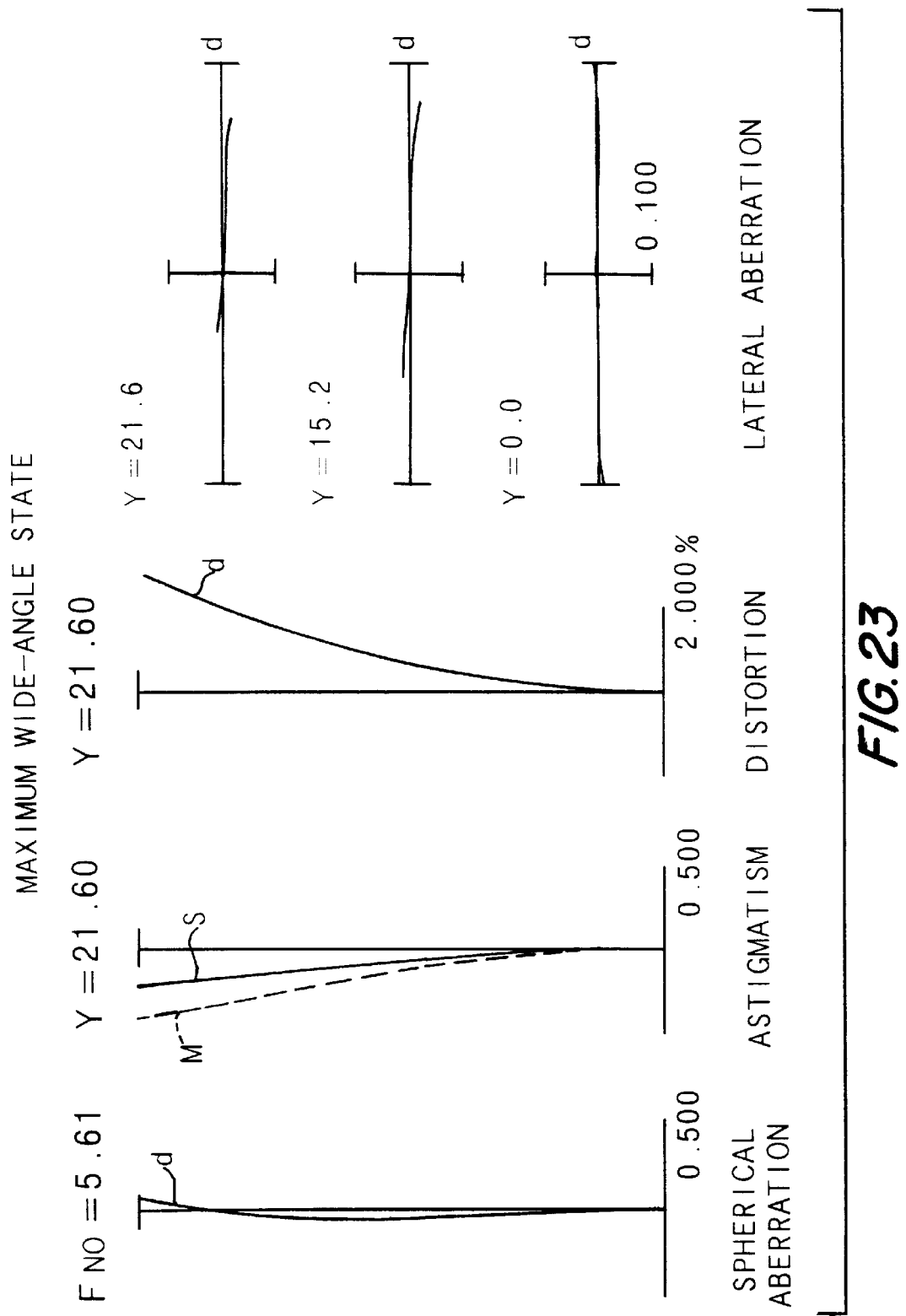
FIG. 23 shows various aberration diagrams at the maximum telephoto state of the fifth embodiment.
Figure 26:
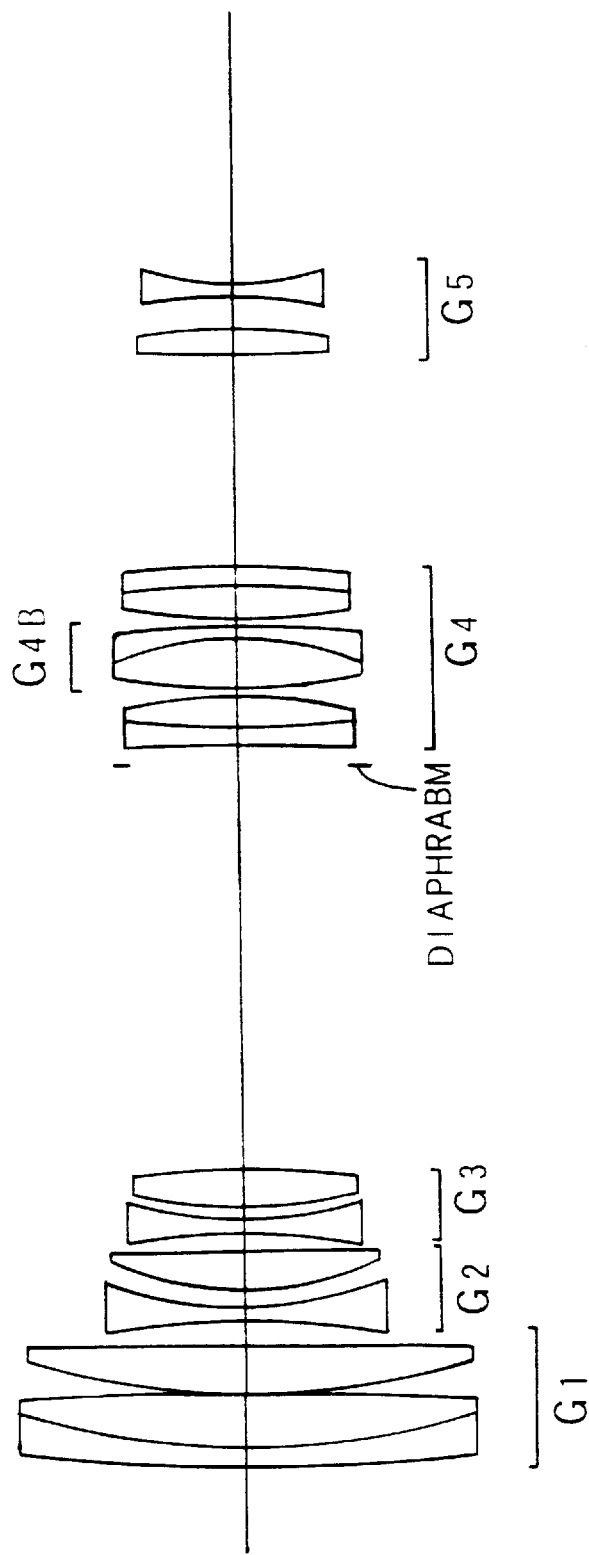
FIG. 26 is a block diagram illustrating a layout of the lenses in a sixth embodiment of the present invention.
Figure 27:
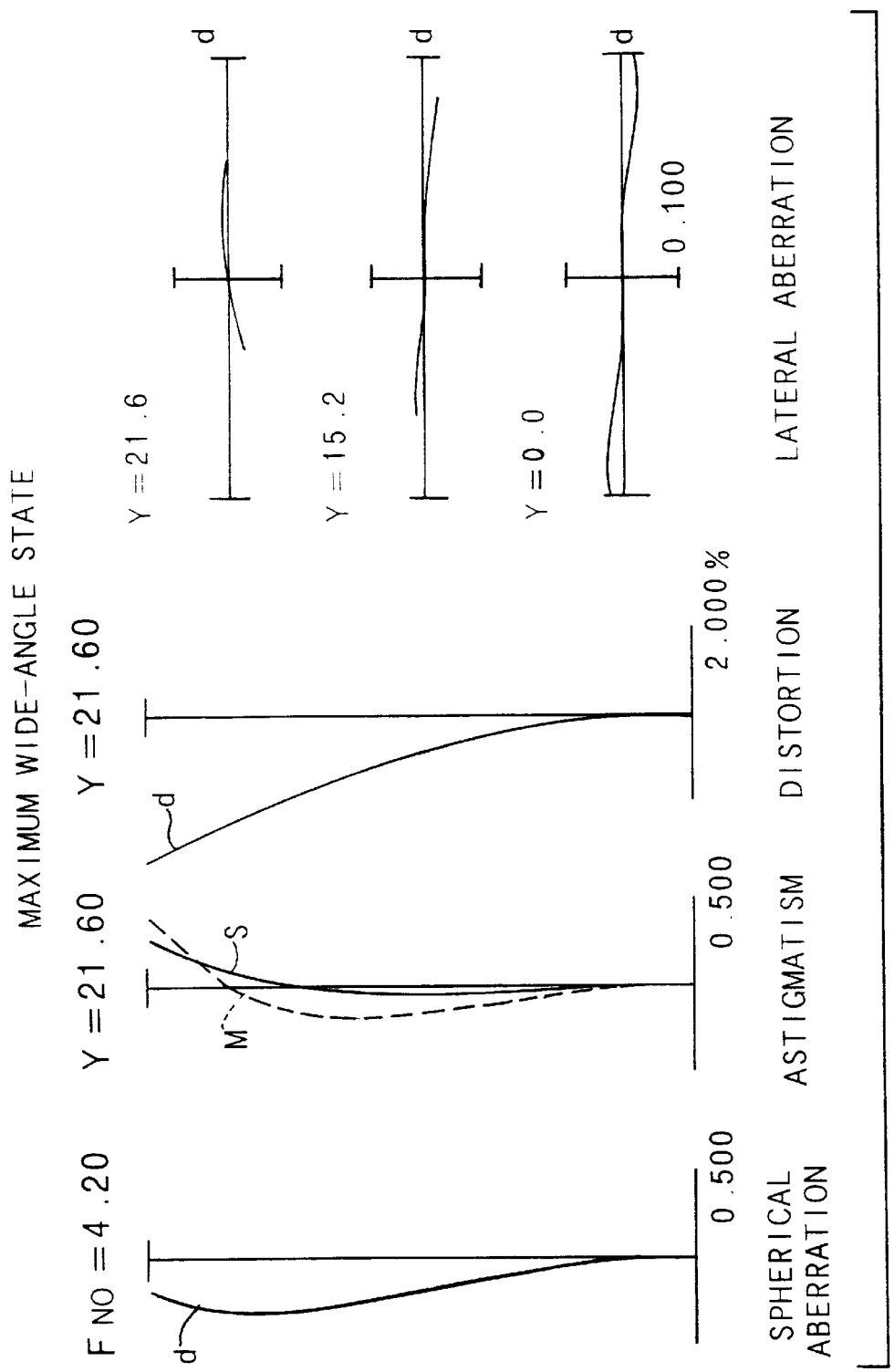
FIG. 27 shows various aberration diagrams at the maximum wide-angle state of the sixth embodiment.
Figure 28:
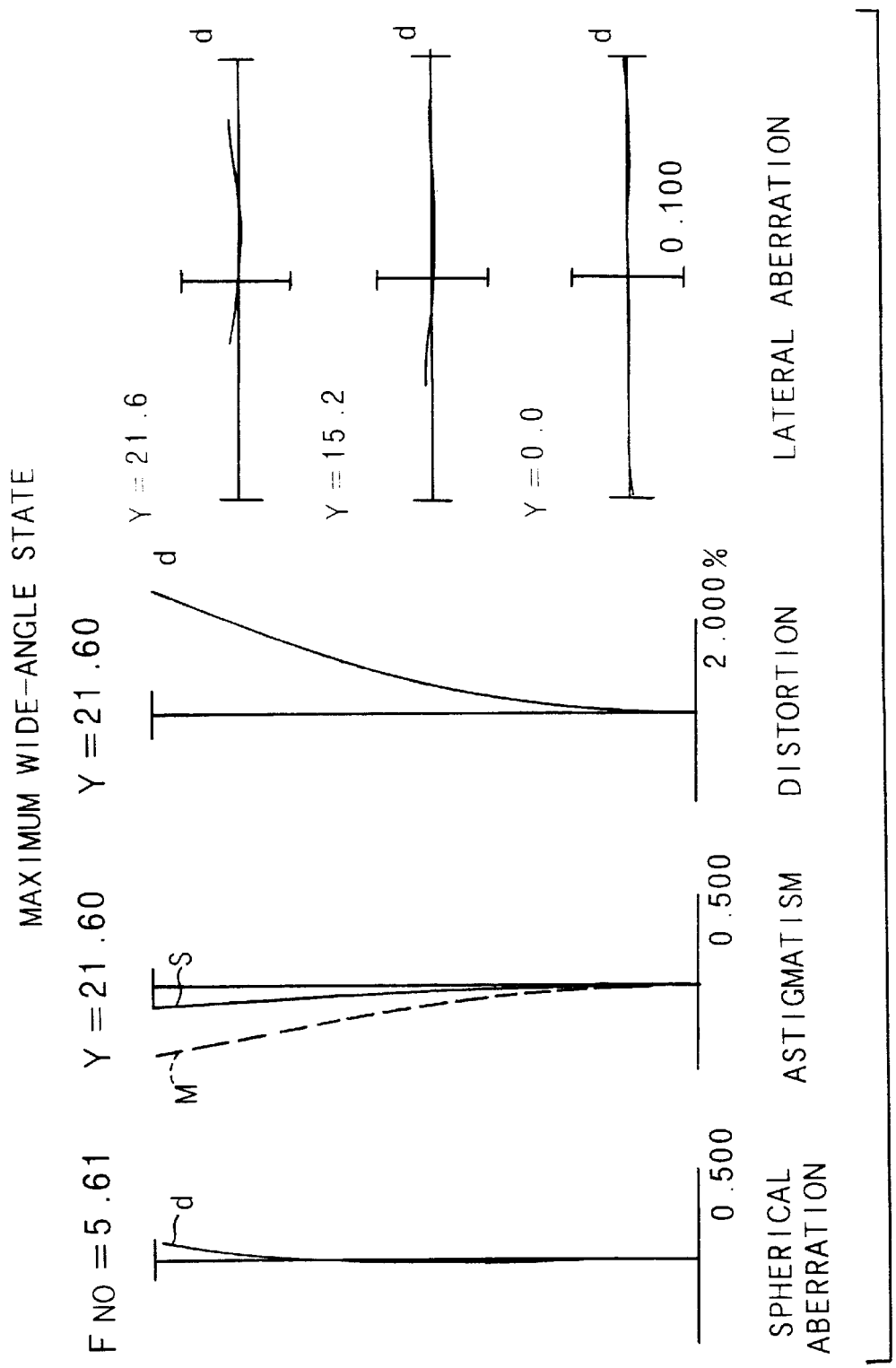
FIG. 28 shows various aberration diagrams at the maximum telephoto state of the sixth embodiment.
Figure 31:
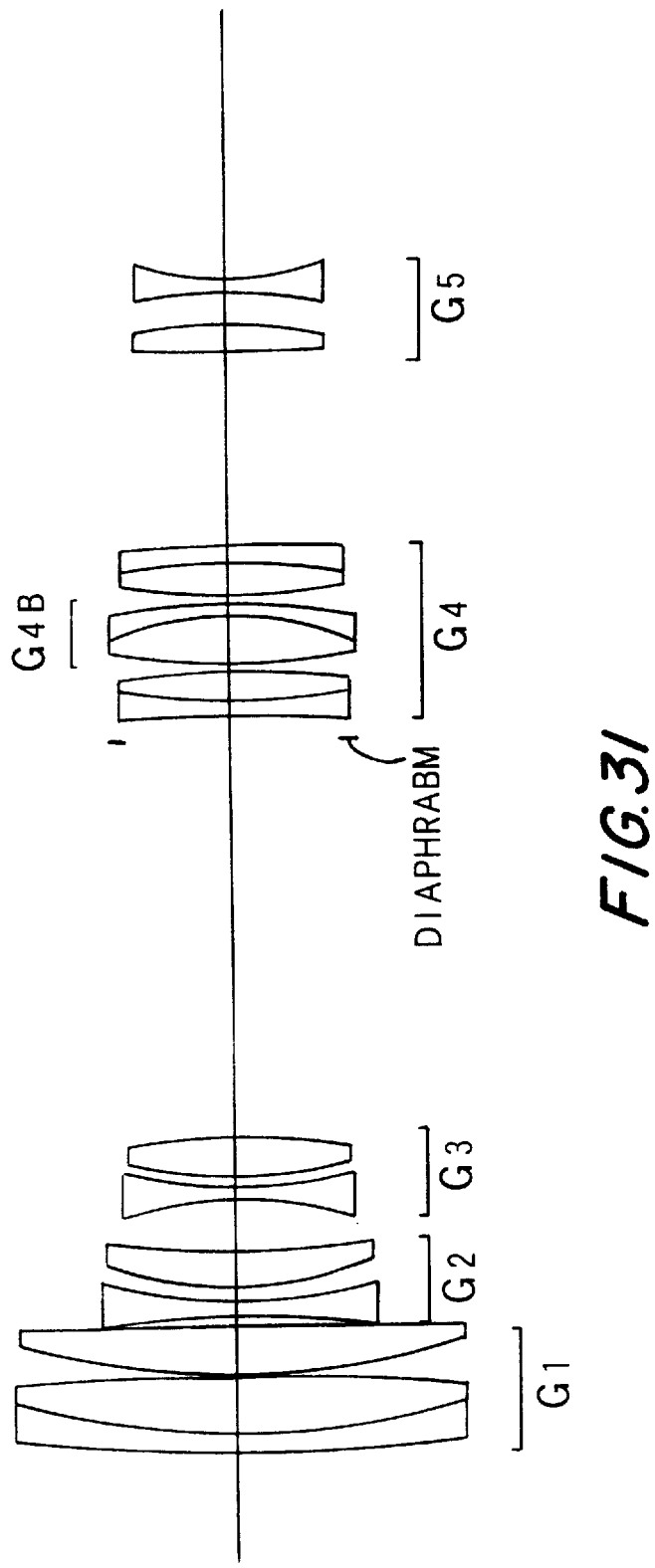
FIG. 31 is a block diagram illustrating a layout of the lenses in a seventh embodiment of the present invention.
Figure 32:
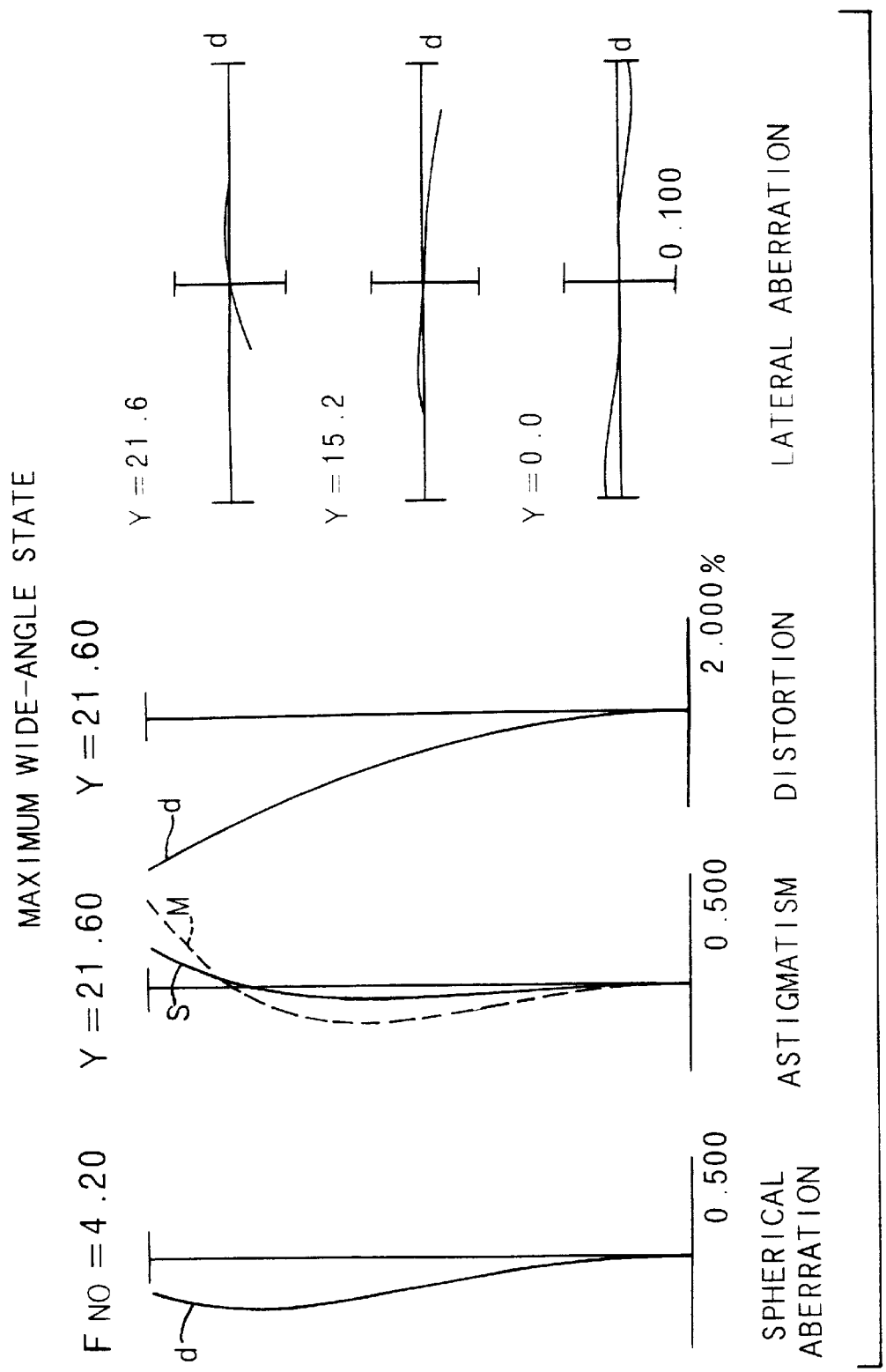
FIG. 32 shows various aberration diagrams at the maximum wide-angle state of the seventh embodiment.
Figure 33:
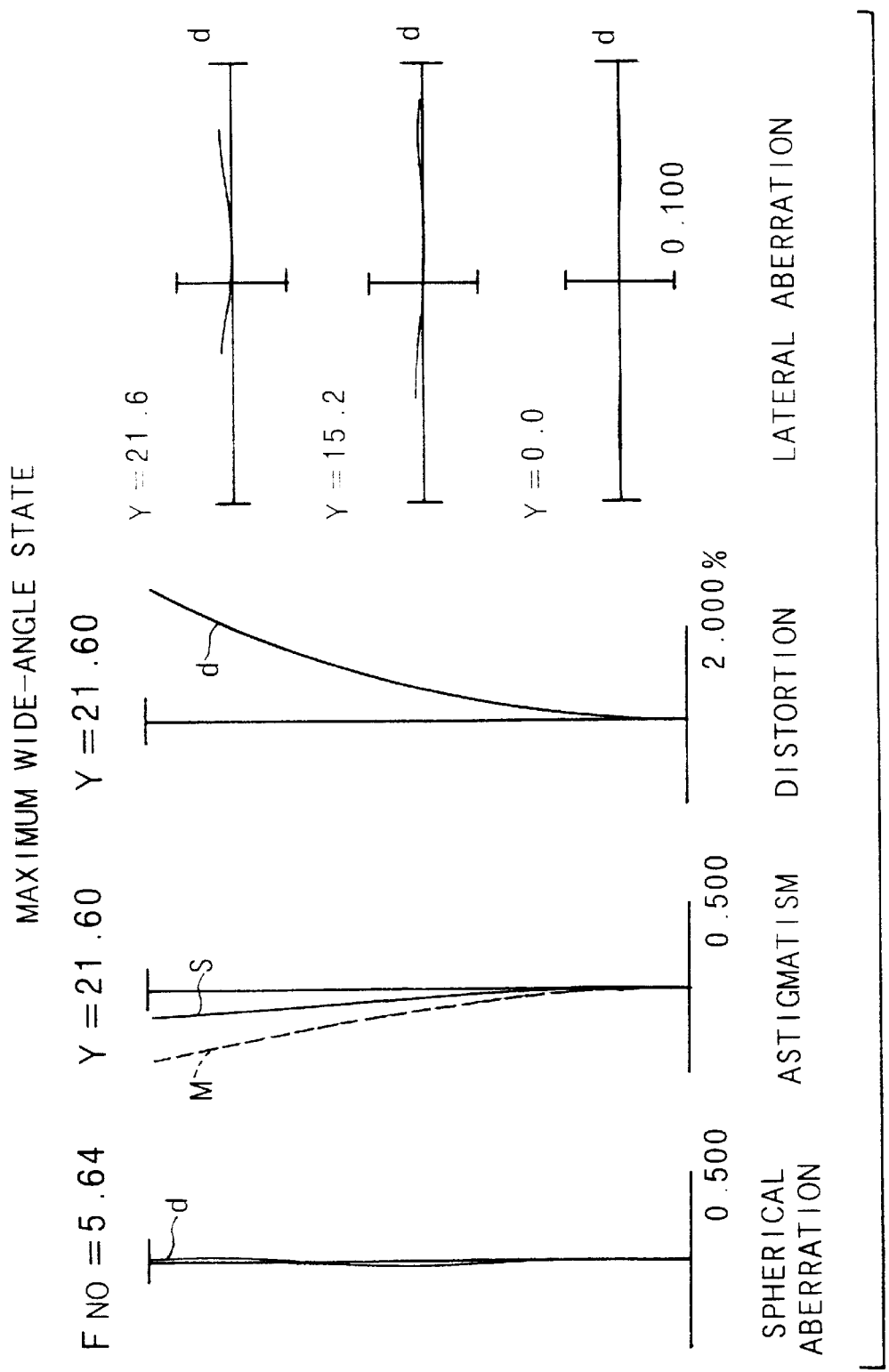
FIG. 33 shows various aberration diagrams at the maximum telephoto state of the seventh embodiment.
Figure 36:
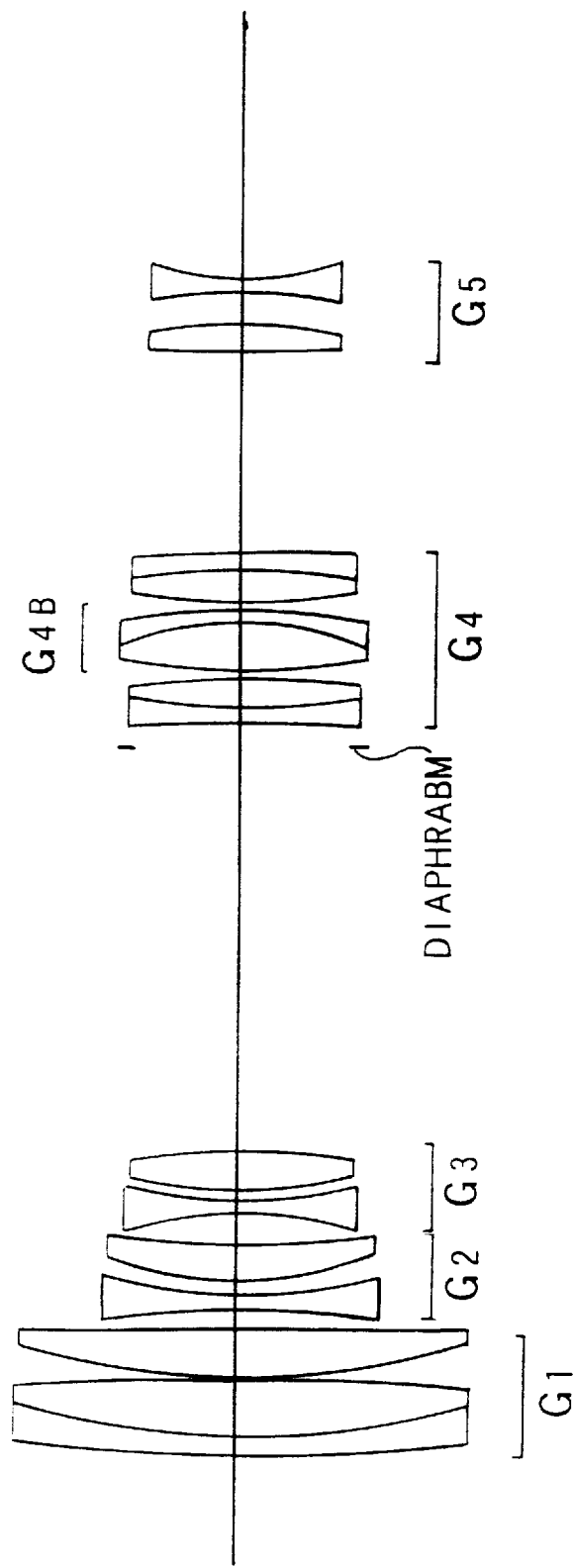
FIG. 36 is a block diagram illustrating a layout of the lenses in an eighth embodiment of the present invention.
Figure 37:
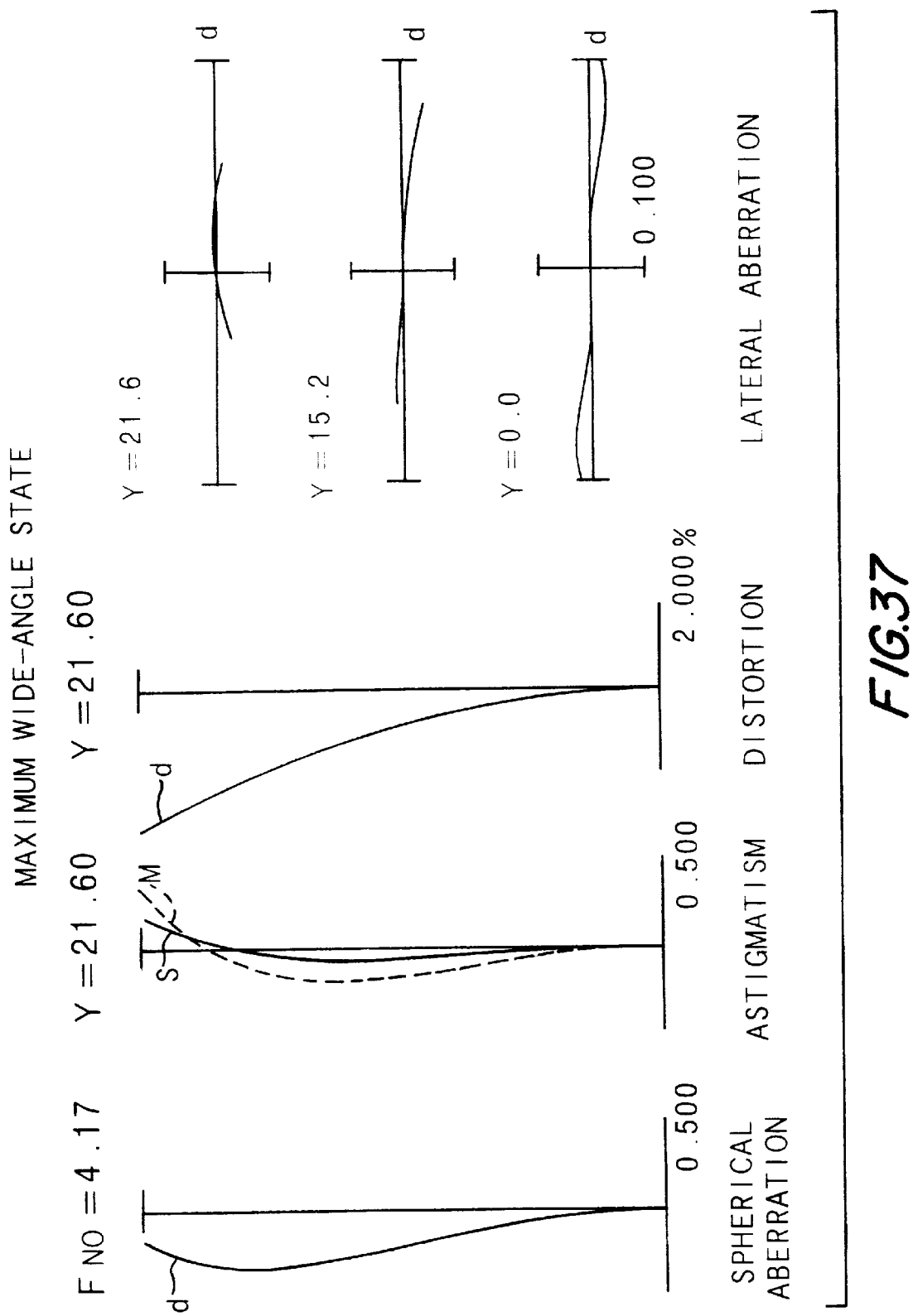
FIG. 37 shows various aberration diagrams at the maximum wide-angle state of the eighth embodiment.
Figure 38:
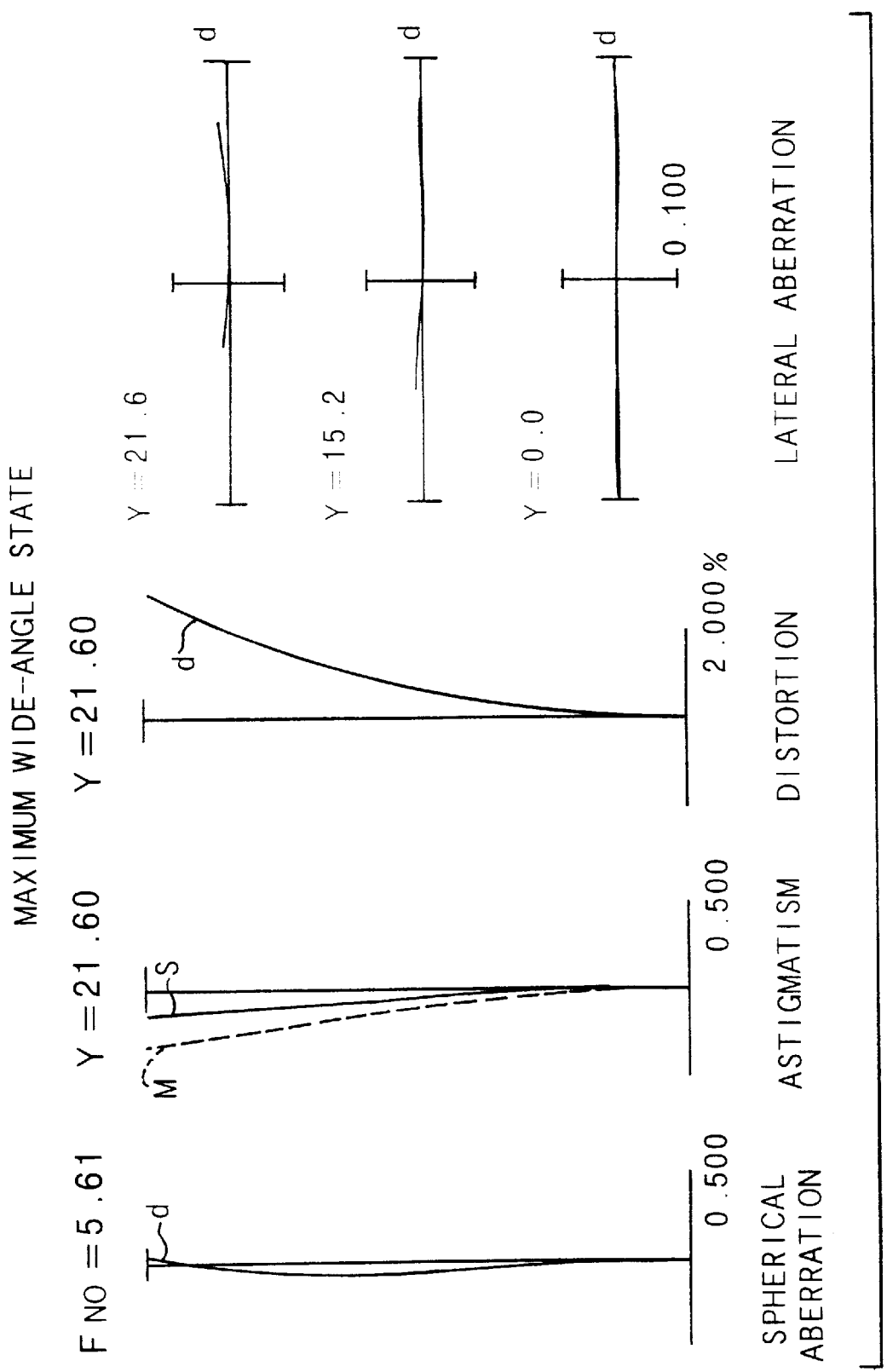
FIG. 38 shows various aberration diagrams at the maximum telephoto state of the eighth embodiment.

FIGS. 17 and 18, respectively, show the spherical aberration, astigmatism, distortion, and lateral aberration at each of the maximum wide-angle and maximum telephoto states in the fourth embodiment in which the lens unit $G_{4P}$ with a vibration-reduction function is arranged concentric to the optical axis. FIGS. 19 and 20, respectively, show the lateral aberration at the wide-angle and maximum telephoto states in the fourth embodiment. In FIG. 19, the shift method was used for vibration reduction, that is, the lens unit $G_{4P}$ with a vibration-reduction function was moved in a direction perpendicular to the optical axis. In FIG. 20, the tilt method was used for vibration reduction, that is, the vibration reduction was performed and the lens unit $G_{4P}$ with a vibration-reduction function was moved around a point on the optical axis. In the same manner, FIGS. 22 through 25, FIGS. 27 through 30, FIGS. 32 through 35 and FIGS. 37 through 40 show various aberrations in the second, third, fourth, and fifth embodiments. In each of the figures showing aberrations, Y shows the image height. Also the dotted lines M show the meridional image surface and the solid line S shows the sagittal image surface in figures showing stigmatism.

It is apparent from each of the figures showing aberrations that each of these embodiments also provide excellent imaging performance in any of the magnifications and methods for vibration-reduction compensation.

The basic Japanese Applications Nos. 79553/1996 filed on Mar. 6, 1996 and 307001/1996 filed on Oct. 31, 1996 are hereby incorporated by reference.

Various modifications will become possible for those skilled in the art after receiving the teachings of the present disclosure without departing from the scope thereof.

What is claimed is:

1. A zoom lens system with vibration-reduction function, having an optical axis, said system comprising, in order from an object side:

a first lens group having a positive refractive power;

a second lens group having a negative refractive power;

a third lens group having a negative refractive power;

a fourth lens group having a positive refractive power; and a fifth lens group having a negative refractive power;

whereby, when zooming, each of the distances between said first and second lens groups, said second and third lens groups, said third and fourth lens groups, and said fourth and fifth lens groups, respectively, changes;

said fourth lens group having a shift lens unit and a first fixed lens unit, said shift lens unit being movable in a direction across said optical axis and having positive refractive power, said first fixed lens unit being fixed in the direction across said optical axis.

2. A zoom lens system, as claimed in claim 1, being movable from a maximum wide-angle state to a maximum telephoto state, and when being so moved, the distance between said first and second lens groups increases while the distance between said fourth and fifth lens groups decreases.

3. A zoom lens system, as claimed in claim 1, wherein said fourth lens group has a focal length, $f_4$, said shift lens unit has a focal length, $f_{4P}$, and the zoom lens system satisfies the following condition:

$$1.0 < f_{4P}/f_4 < 10.0.$$

4. A zoom lens system, as claimed in claim 1, wherein said first fixed lens unit is arranged adjacent to said object side of said shift lens unit.

5. A zoom lens system, as claimed in claim 4, further comprising a second fixed lens unit in said fourth lens group, said second fixed lens unit being arranged adjacent to said image side of said shift lens unit fixed in the direction across the optical axis.

6. A zoom lens system, as claimed in claim 5, wherein said second fixed lens unit has a positive refractive power.

7. A zoom lens system with vibration-reduction function, having an optical axis, said system comprising, in order from an object side:

a first lens group $G_1$ having a positive refractive power;

a second lens group $G_2$ having a negative refractive power;

a third lens group $G_3$ having a negative refractive power;

a fourth lens group $G_4$ having a positive refractive power; and a fifth lens group $G_5$ having a negative refractive power;

whereby, when zooming, said lens groups are moved such that the distance between said first lens group $G_1$ and said second lens group $G_2$ increases, the distance between said second lens group $G_2$ and said third lens group $G_3$ varies linearly or nonlinearly, and the distance between said fourth lens group $G_4$ and said fifth lens group $G_5$ decreases;

said fourth lens group $G_4$ having a shift lens unit $G_{4P}$ with a vibration-reduction function, having a positive refractive power, wherein said lens unit $G_{4P}$ with a vibration-reduction function is movable across said optical axis.

8. A zoom lens system, as claimed in claim 7, which satisfies the following conditions:

$$0.3 < f_1 / (f_W \cdot f_T)^{1/2} < 1.5 \quad (1)$$
$$0.2 < D_{W3\text{-}4} / f_W < 10 \quad (2)$$
$$1.0 < f_{4P} / f_4 < 10.0 \quad (3)$$

where $f_1$ is the focal length of said first lens group $G_1$;

$f_4$ is the focal length of said fourth lens group $G_4$;

$f_W$ is the focal length of the entire zoom lens system at the maximum wide-angle state;

$f_T$ is the focal length of the entire zoom lens system at the maximum telephoto state;

$D_{W3\text{-}4}$ is the focal length between said third lens group $G_3$ and said fourth lens group $G_4$ at the maximum wide-angle state; and $f_{4P}$ is the focal length for said lens unit $G_{4P}$.

9. A zoom lens system, as claimed in claim 8, wherein said fourth lens group $G_4$ comprises a front lens unit $G_{4F}$ on the object side of said lens unit $G_{4P}$, said front lens unit $G_{4F}$ having a positive refractive power.

10. A zoom lens system, as claimed in claim 9, comprising a flared stop fixed onto said optical axis during eccentric movement of said lens unit $G_{4P}$ with a vibration-reduction function.

11. A zoom lens system, as claimed in claim 9, wherein said lens unit $G_{4P}$ with a vibration-reduction function rotates about a point on said optical axis.

12. A zoom lens system, as claimed in claim 9, wherein said lens unit $G_{4P}$ with a vibration-reduction function moves in a direction substantially perpendicular to said optical axis during vibration reduction.

13. A zoom lens system, as claimed in claim 8, wherein said fourth lens group $G_4$ comprises, in order from said object side, a front lens unit $G_{4F}$ having a positive or negative refractive power, said lens unit $G_{4P}$ with a vibration-reduction function, and a rear lens unit $G_{4R}$ having a positive refractive power.

14. A zoom lens system, as claimed in claim 8, comprising a flared stop fixed onto said optical axis during eccentric movement of said lens unit $G_{4P}$ with a vibration-reduction function.

15. A zoom lens system, as claimed in claim 8, wherein said lens unit $G_{4P}$ with a vibration-reduction function rotates about a point on said optical axis.

16. A zoom lens system, as claimed in claim 8, wherein said lens unit $G_{4P}$ with a vibration-reduction function moves in a direction substantially perpendicular to said optical axis during vibration reduction.

17. A zoom lens system, as claimed in claim 13, wherein said lens unit $G_{4P}$ with a vibration-reduction function rotates about a point on said optical axis.

18. A zoom lens system, as claimed in claim 13, wherein said lens unit $G_{4P}$ with a vibration-reduction function moves in a direction substantially perpendicular to said optical axis during vibration reduction.

19. A zoom lens system, as claimed in claim 7, wherein said fourth lens group $G_4$ comprises a front lens unit $G_{4F}$ on the object side of said lens unit $G_{4P}$, said front lens unit $G_{4F}$ having a positive refractive power.

20. A zoom lens system, as claimed in claim 19, comprising a flared stop fixed onto said optical axis during eccentric movement of said lens unit $G_{4P}$ with a vibration-reduction function.

21. A zoom lens system, as claimed in claim 19, wherein said lens unit $G_{4P}$ with a vibration-reduction function rotates about a point on said optical axis.

22. A zoom lens system, as claimed in claim 19, wherein said lens unit $G_{4P}$ with a vibration-reduction function moves in a direction substantially perpendicular to said optical axis during vibration reduction.

23. A zoom lens system, as claimed in claim 7, wherein said fourth lens group $G_4$ comprises, in order from said object side, a front lens unit $G_{4F}$ having a positive or negative refractive power, said lens unit $G_{4P}$ with a vibration-reduction function, and a rear lens unit $G_{4R}$ having a positive refractive power.

24. A zoom lens system, as claimed in claim 23, comprising a flared stop fixed onto said optical axis during eccentric movement of said lens unit $G_{4P}$ with a vibration-reduction function.

25. A zoom lens system, as claimed in claim 23, wherein said lens unit $G_{4P}$ with a vibration-reduction function rotates about a point on said optical axis.

26. A zoom lens system, as claimed in claim 23, wherein said lens unit $G_{4P}$ with a vibration-reduction function moves in a direction substantially perpendicular to said optical axis during vibration reduction.

27. A zoom lens system, as claimed in claim 7, comprising a flared stop fixed onto said optical axis during eccentric movement of said lens unit $G_{4P}$ with a vibration-reduction function.

28. A zoom lens system, as claimed in claim 27, wherein said lens unit $G_{4P}$ with a vibration-reduction function rotates about a point on said optical axis.

29. A zoom lens system, as claimed in claim 27, wherein said lens unit $G_{4P}$ with a vibration-reduction function moves in a direction substantially perpendicular to said optical axis during vibration reduction.

30. A zoom lens system, as claimed in claim 7, wherein said lens unit $G_{4P}$ with a vibration-reduction function rotates about a point on said optical axis.

31. A zoom lens system, as claimed in claim 7, wherein said lens unit $G_{4P}$ with a vibration-reduction function moves in a direction substantially perpendicular to said optical axis during vibration reduction.

32. A zoom lens system with vibration-reduction function having an optical axis, said system comprising, in order from an object side:

a first lens group $G_1$ having a positive refractive power;

a second lens group $G_2$ having a negative refractive power;

a third lens group $G_3$ having a negative refractive power;

a fourth lens group $G_4$ having a positive refractive power; and a fifth lens group $G_5$ having a negative refractive power;

whereby, when zooming, each of the distances between said first and second lens groups, said second and third lens groups, said third and fourth lens groups, and said fourth and fifth lens groups, respectively, changes;

said fourth lens group $G_4$ having a shift lens unit $G_{4P}$ moveable across said optical axis, said shift lens unit $G_{4P}$ having a positive refractive power and satisfies the following conditions:

$$1.0 < f_{4P}/f_4 < 2.5$$

where $f_{4P}$ is the focal length for said lens unit $G_{4P}$ with a vibration-reduction function in said fourth lens group $G_4$, and $f_4$ is the focal length for said fourth lens group $G_4$.

33. A zoom lens system, as claimed in claim 32, wherein said fourth lens group $G_4$ comprises at least three lens components including said lens unit $G_{4P}$ with a vibration-reduction function.

34. A zoom lens system, as claimed in claim 33, wherein said lens unit $G_{4P}$ with a vibration-reduction function, is movable in a direction substantially perpendicular to said optical axis.

35. A zoom lens system, as claimed in claim 33, wherein said lens unit $G_{4P}$ with a vibration-reduction function, is rotatable about a point on said optical axis.

36. A zoom lens system, as claimed in claim 32, wherein said lens unit $G_{4P}$ with a vibration-reduction function, is movable in a direction substantially perpendicular to said optical axis.

37. A zoom lens system, as claimed in claim 32, wherein said lens unit $G_{4P}$ with a vibration-reduction function, is rotatable about a point on said optical axis.

\* \* \* \* \*